US006538904B1

(12) United States Patent
Isely et al.

(10) Patent No.: US 6,538,904 B1
(45) Date of Patent: Mar. 25, 2003

(54) EXPANDABLE CABLE DISTRIBUTION APPARATUS INCLUDING INTERCHANGEABLE AND REMOVABLE CABLE DISTRIBUTION MODULES

(75) Inventors: Larson J. Isely, Durham, NC (US); Karen Birbeck, Cary, NC (US); Jack Dix, Graham, NC (US); Gary Deen, Durham, NC (US); William J. Grasty, Chapel Hill, NC (US); Jeffrey A. Hatley, Mebane, NC (US); Matthew S. Henry, Durham, NC (US); Larry M. Hicks, Oxford, NC (US); Gerald L. Loudermilk, Raleigh, NC (US)

(73) Assignee: Home Director, Inc., Morrisville, NC (US)

( * ) Notice: Subject to any disclaimer, the term of this patent is extended or adjusted under 35 U.S.C. 154(b) by 0 days.

(21) Appl. No.: 09/621,434

(22) Filed: Jul. 21, 2000

(51) Int. Cl.⁷ .................................................. H02B 1/20
(52) U.S. Cl. ........................ 361/826; 361/828; 439/953
(58) Field of Search ................................ 361/826–828, 361/725–741, 759, 796, 798, 825; 312/223.2, 223.1; 211/26; 439/953, 350, 328

(56) References Cited

U.S. PATENT DOCUMENTS

| | | | |
|---|---|---|---|
| 4,980,800 A | * 12/1990 | Furuta | 361/391 |
| 5,014,164 A | * 5/1991 | Casa et al. | 361/428 |
| 5,682,301 A | 10/1997 | Kraft | 361/826 |
| 5,770,928 A | * 6/1998 | Chansky | 315/362 |
| 5,774,979 A | 7/1998 | Kraft | 29/857 |
| 6,074,247 A | 6/2000 | Hall et al. | 439/532 |
| 6,102,214 A | * 8/2000 | Mendoza | 211/26 |

FOREIGN PATENT DOCUMENTS

WO    WO 00/03518    1/2000    .......... H04L/12/28

* cited by examiner

*Primary Examiner*—Albert W. Paladini
*Assistant Examiner*—Tuan Dinh

(57) ABSTRACT

A method and apparatus for mounting an electronic component within a housing is provided comprising a modular equipment rack bracket for electronic equipment including a first and second mounting bracket arm for mounting to a housing rack assembly and a frame member for supporting a plurality of electrical supply cabling, signal cabling or data cabling and the like. The first and second mounting bracket arms are affixed to the front of the housing rack assembly and have associated therewith a plurality of fastener openings for attaching electronic components thereto. The frame member is coupled to one of a plurality of coupling means of the first and second mounting bracket arms allowing the electronic component to be affixed to the mounting bracket in either a front-facing forward configuration or a rear-facing forward configuration without removing the affixed first and second mounting bracket arms from the rack housing assembly.

41 Claims, 18 Drawing Sheets

EXPANDABLE CABLE DISTRIBUTION APPARATUS INCLUDING INTERCHANGEABLE AND REMOVABLE CABLE DISTRIBUTION MODULES

FIELD OF THE INVENTION

The invention relates in general to the field of electronic component enclosures, and, more particularly, to an object for mounting a electronic system component within a housing rack assembly.

BACKGROUND OF THE INVENTION

Many systems have been proposed for racking and storing electronic equipment such as computer equipment, audio-visual equipment, musical equipment and the like. Specifically, numerous systems have been developed for computer equipment consisting of multiple components that require electrical supply cable connections and signal or data cable interconnections for each component. Therefore, in order to neatly, safely and efficiently store numerous pieces of equipment, a rack system is generally utilized. Electronic equipment such as computer components are often arranged in "drawers" or units having particular dimensions and fasteners which permit mounting within a vertical rack or load-bearing frame. Rack-mountable components are widely used because they are easily installed or removed. A rack system also permits a flexible system configuration.

In many computer environments, including large-scale operations such as data centers, server-farms, web-hosting facilities and call centers, as well as small-scale computer environments, space is an important concern. For a computer environment to operate efficiently, electronic components are often neatly racked allowing for access to the components for installation and removal. Furthermore, a rack system provides access to the components for connecting the electrical supply cables and the data cables. As various types of electronic equipment have become more complex, more densely packaged and more compact in size, vertical frames known in the prior art have proved deficient or disadvantageous in several ways.

It is common in electronic equipment construction to mount electronic equipment in drawers or slide units which slide into a suitable equipment rack in spaced parallel relationship. The "drawers" often comprise modular instrument housings which slide into suitable slots in the rack, or support structure. Most of the electronic equipment in the rack must be interconnected. The interconnection of the electronic components can cause problems when changes must be made to the overall system mounted on the rack or to any of the individual electronic components mounted to the rack.

In electronic equipment applications, numerous types of electronic equipment are often placed in a rack system. Different equipment manufacturers or distributors of electronic equipment often do not employ a consistent programming format and protocol. That is, there is little uniformity in the location and distribution of display panels, input/output connections and wiring interfaces of similar electronic equipment produced by different manufacturers. Even when identical programming formats and protocols are used, details of the placement of display panels, input/output connections and wiring interfaces differ from manufacturer to manufacturer. Therefore, many electronic assemblies that have identical electrical characteristics are not interchangeable without some sort of programming or reconfiguration.

There are also often mechanical differences between electronic equipment supports or drawers designed to slide into an equipment rack. These differences prevent easy interchangeability. The differences include rather simple items such as connector quantity, location, size and pin allocation. These seemingly trivial problems force conventional rack wiring and rack component placement to undergo extensive re-work when a system has to be reconfigured. Expensive, complex, and time consuming reconstruction, often beyond the capability of field personnel, must be performed. Thus, rack wiring and rack component placement has been a major impediment to all previous attempts to provide easy racking of systems.

As electronic components become more densely packed, more heat is generated and ventilation becomes critically important to ensure that the components will function properly. Prior art frames designed for use with less densely packed components are often not able to accommodate larger ventilation grilles or fans due to interfering structural members. Many conventional frames include structural members which, because of location or orientation, place severe restrictions on the design of exterior panels, doors, grilles and the like.

Thus, it is well known in the art to provide a rack system for storing and operating electronic components in an organized and accessible manner. However, numerous inventions have been proposed which limit the access to each of the racked electronic components. For example, in order to access any of the wiring interfaces for the interconnection of the electronic equipment to other components in the rack, one must turn the housing rack system around to access the rear of the housing rack system and the racked electronic components. This proves to be very difficult in many situations where space is limited in addition to situations where extensive cabling is required to operate a multitude of electronic components. Therefore, it is often desirable to mount several pieces of electronic components with the rear of the unit facing forward. In order to mount electronic equipment in this manner, a new bracket would be required that is specifically designed for mounting the electronic components with the rear-facing-forward. Thus, it is desirable to provide a rack system which employs a modular equipment rack bracket which allows for any type of electronic equipment to be mounted in either a front-facing-forward configuration or a rear-facing-forward configuration without requiring the user to utilize more than one equipment rack bracket.

Rinderer U.S. Pat. No. 5,284,254 discloses a rack for electrical equipment including a base having a bottom wall, and a back wall extending up from the bottom wall at the back of the rack. The bottom wall has a plurality of fastener openings therein through which fasteners may be driven into a surface supporting the rack for securing the rack to the surface. A pair of legs extend up from the bottom wall of the base at opposite sides of the base adjacent the back wall of the base. A cover may be removably fastened to the base of the rack in a position where the cover extends forward from the back wall of the base between the legs of the rack and is spaced above the bottom wall of the base to form, in combination with the back and bottom walls of the base, an enclosure for electrical wiring and the like. Removal of the cover from the base provides ready access to the electrical wiring and the like and also the fastener openings in the bottom wall of the base for facilitating securement of the rack to the surface. However, Rinderer fails to disclose a rack bracket and method for installing an electronic component in either front-facing-forward configuration or a rear-facing-forward configuration. Furthermore, Rinderer fails to disclose a frame member for supporting a plurality of electrical cabling for either a front-facing-forward or a rear-facing-forward electronic component for reducing the weight strain of the cabling on the electronic component's cabling interfaces.

Mills U.S. Pat. No. 5,791,498 discloses a rack mount mechanism that includes first and second recessed slides fixed in a stationary position and first and second mounting brackets slideably mounted on the first and second recessed slides, respectively. The first and second mounting bracket arms each have front and back ends extending, for example, perpendicularly inward from the base of the mounting brackets. A frame is included which is attachable to the computer enclosure and has front and back rails. Each rail has an edge extending, for example, perpendicularly outward from the base of the rail and each edge has a plurality of apertures. An angled bar-nut is coupled to each of the rails by threading the angled portion of each angled bar-nut through an aperture in the edge of the rail and including a screw and a cage nut to secure the angled portion of each angled bar-nut to the edge of each rail. The front and back ends of the first and second mounting brackets are positioned between and coupled to each angled bar-nut and the edge of the front and back rails, respectively. However, Mills fails to disclose a method and apparatus for installing an electronic component in either a front-facing-forward configuration or a rear-facing-forward configuration including a frame member for supporting a plurality of electrical cabling.

Hull U.S. Pat. No. 5,794,794 discloses a modular rack system for supporting electronic equipment, comprising vertical and lateral frame members cooperating to form a vertical supporting frame, and shelf or rack members supported from a front of the frame for carrying the electronic equipment, wherein the vertical and horizontal frame members comprise channel members with walls defining continuous longitudinal openings at a rear of the frame and cooperating to form a system of interconnected raceways for receiving cables for forming connections to and between the electronic equipment, the walls of the channel shaped members defining ports for passing end connectors of cables. However, Hull fails to disclose a rack bracket and method for installing an electronic component in either a front-facing-forward or a rear-facing-forward configuration. Furthermore, Hull fails to disclose a frame member for supporting a plurality of electrical cables for either a front-facing-forward or a rear-facing-forward electronic component for reducing the weight strain of the cabling on the electronic component's cabling interfaces.

Ott et al. U.S. Pat. No. 5,945,633 discloses a rack mountable cable distribution enclosure. The cable distribution enclosure includes a tray that slides forwards and backwards out of the cable distribution enclosure. The tray includes an adapter plate bracket which receives a plurality of adapter plates. The adapter plates are mounted in a horizontal orientation, parallel to the sliding tray. However, Ott et al. fails to disclose a method and apparatus for installing an electronic component in either a front-facing-forward or a rear-facing-forward configuration.

Gibbons U.S. Pat. No. 6,123,203 discloses a system and method for mounting a desk side computer system component within a housing. The mounting system includes a component chassis that defines an interior space, a mating slot formed in the component chassis that provides access to the interior space, an adaptive mounting ear and an insertion tab associated with the adaptive mounting ear. The adaptive mounting ear may be operable to simultaneously couple both the housing and the component chassis. When coupling the adaptive mounting ear to the component chassis, the insertion tab is inserted through the mating slot associated with the component chassis and into the interior space defined by the component chassis. The insertion tab remains within the interior space when the adaptive mounting ear is coupled to the component chassis. However, Gibbons is limited to mounting a desk side computer system component. Furthermore, Gibbons fails to disclose a mounting bracket and method for installing an electronic component in either a front-facing-forward or a rear-facing-forward configuration. Gibbons fails to disclose a frame member for supporting a plurality of electrical cables for either a front-facing-forward or a rear-facing-forward electronic component for reducing the weight strain of the cabling on the electronic component's cabling interfaces.

Therefore, it is desirable in the art to provide a simple method and apparatus for installing and removing an electronic component in either a front-facing-forward configuration or a rear-facing-forward configuration within a housing.

Further, it is an object of the present invention to provide a modular equipment rack bracket for use with a plurality of electronic components.

Furthermore, it is an object of the present invention to provide a modular equipment rack bracket for use with a standard-housing rack system in addition to other known housing rack systems.

In addition, it is particularly desirable to provide a simple method and apparatus for mounting an electronic component in a housing rack system wherein one electronic device may be easily and quickly substituted for another electronic device.

It is further desirable to provide a simple method and apparatus for mounting an electronic component in either a front-facing-forward electronic component or a rear-facing-forward configuration within a housing while allowing the electronic components within the rack to easily interface with one another.

It is also desirable to provide a modular equipment rack bracket and method for storing electronic components in a rack housing system that allows for ease of access to the electronic equipment.

It is still a further object of the present invention to provide a method and apparatus for mounting electronic components within a housing rack system that is strengthened for use in areas prone to seismic occurrences.

In view of the foregoing, clearly there exists a need for an improved method and apparatus for installing or removing numerous types of electronic components in either a front-facing-forward configuration or a rear-facing-forward configuration within a housing rack system. Furthermore, it remains a requirement in the art to provide an electronic equipment rack bracket that is compatible with a plurality of electronic components and can be affixed to a standard housing rack system, in addition to similar housing rack systems known in the art, which allows for ease of access in removing and installing electronic components. Further, it is desirable in the art to provide an electronic equipment rack bracket which relieves the strain of heavy cables on the interfaces of racked electronic components.

SUMMARY OF THE INVENTION

An object of the present invention is to provide a modular equipment rack bracket for use in a standard housing rack system that supports an array of electronic components supplied by different equipment manufacturers or distributors of electronic equipment. In addition, another object of the present invention is to offer a modular equipment rack bracket that provides a substantial degree of organization of the associated cables of an array of electronic components.

Disclosed is an improved method and apparatus for installing or removing numerous types of electronic components in either a front-facing-forward configuration or a rear-facing-forward configuration within a housing rack system. This invention provides a modular equipment rack bracket for supporting electronic components in a housing rack system which is compatible with a multitude of electronic components. In addition, the invention provides a modular equipment rack bracket that allows for any equipment component to be affixed to the housing rack system with the front-facing-forward or the rear-facing-forward without requiring modification of the individual components. The electronic equipment may be affixed to the housing rack system allowing for access to the wiring interfaces from either the front of the housing rack system or the rear of the housing rack system. Since many manufacturers and distributors of electronic equipment use numerous platforms for electronic components which employ minimal uniformity in the location and distribution of display panels, input/output connections and wiring interfaces it is desirable in the art for an equipment rack bracket to exhibit characteristics that allow for multiple choices in affixing electronic components in a single rack.

A modular equipment rack bracket for electronic equipment is disclosed including a first and second mounting bracket arm for mounting to a housing rack assembly and a frame member for supporting a plurality of electrical supply cabling, signal cabling or data cabling and the like. The first and second mounting bracket arms each have a front end and a back end. The front end of the first and second mounting bracket arms is affixed, for example, perpendicularly to the front of the housing rack assembly thereby allowing the first and second mounting bracket arms to extend inwardly within the housing rack assembly. The first and second mounting bracket arms have associated therewith a plurality of attachment means for attaching a multitude of electronic components thereto. In addition, the first and second mounting bracket arms comprise a plurality of coupling means for perpendicularly affixing the frame member thereto. The frame member is coupled to one of a plurality of coupling means of the first and second mounting bracket arms allowing the electronic component to be affixed to the mounting bracket arms in either a front-facing configuration or a rear-facing configuration without removing the affixed first and second mounting bracket arms from the rack housing assembly. The frame member is provided for supporting a plurality of electrical cabling for either a front-facing-forward electronic component or a rear-facing-forward component thereby reducing the weight strain of the cabling on the electronic component's cabling interfaces. In addition, the apparatus may further include optional bracing so that the rack is strengthened for use in areas prone to seismic occurrences.

Other objects, features and characteristics of the present invention, as well as the methods of operation and functions of the related elements of the invention, and the combination of parts and economies of development and performance, will become more apparent upon consideration of the following detailed descriptions with reference to the accompanying drawings, all of which form a part of this specification.

BRIEF DESCRIPTION OF THE DRAWINGS

A further understanding of the present invention can be obtained by reference to the preferred embodiment set forth in the illustrations of the accompanying drawings. Although the illustrated embodiment is merely exemplary of systems for carrying out the present invention, both the organization, expanded configurations and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1:
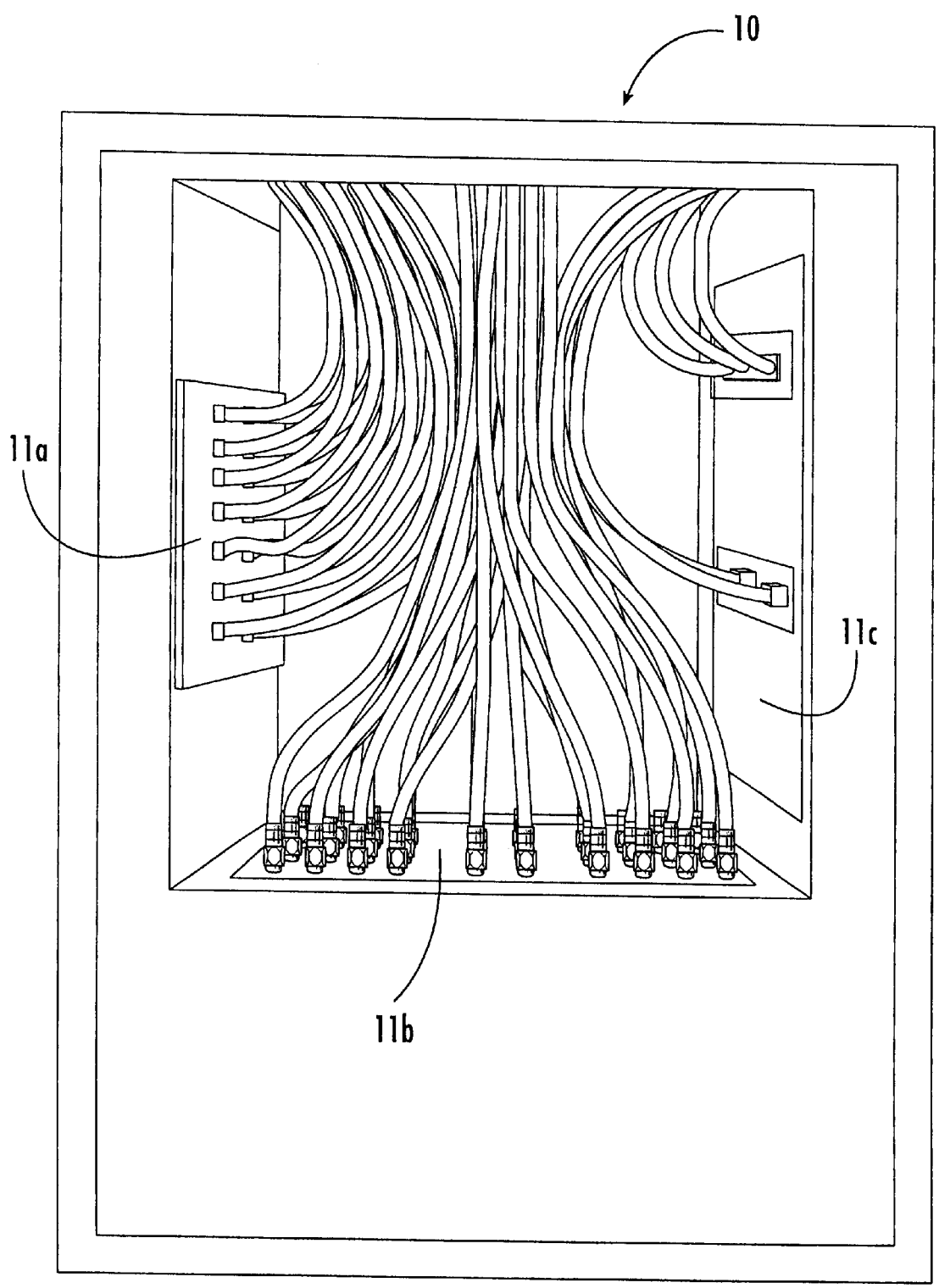
FIG. 1 is a perspective view of the preferred embodiment of the modular rack bracket for an electronic component according to the present invention, wherein a front-facing-forward electronic component may be affixed.

Referring first to FIG. 1, depicted is modular equipment rack bracket 100 for mounting electronic equipment in a front-facing-forward position including first mounting bracket arm 102 and second mounting bracket arm 104 for mounting to a housing rack assembly (not shown) and frame member 106 for supporting a plurality of electrical supply cabling, signal cabling or data cabling and the like (not shown). First mounting bracket arm 102 and second mounting bracket arm 104 each comprise front end 108, 112, respectively and back end 110, 114, respectively. Front end 108 of first mounting bracket arm 102 and front end 112 of second mounting bracket arm 104 are affixed via connecting means 122, for example, perpendicularly to the front of the housing rack assembly thereby allowing first mounting bracket arm 102 and second mounting bracket arm 104 to extend inwardly within the housing rack assembly. First and second mounting bracket arms 102, 104 respectively have associated therewith a plurality of fastener openings 116 for attaching any of a multitude of electronic components thereto in either a front-facing-forward or rear-facing-forward configuration. The fastener openings 116 may be compatible with all types of screws, bolts, nuts, clamps, pins, rivets, adhesives and the like. Although fastener openings 116 are utilized in the preferred embodiment, it is foreseeable that additional fastening means such as universal joints, tongue and grove joints, welded joints, wedged joints and the like may be an integral part of first and second mounting bracket arms 102 and 104. In addition, first and second mounting bracket arm 102 and 104 may comprise a plurality of coupling means 118 for affixing frame member 106 thereto. Frame member 106 is coupled, for example, perpendicularly to one of a plurality of coupling means 118 of first and second mounting bracket arms 102 and 104 allowing the electronic component to be affixed therein (i.e., between first mounting bracket arm 102 and second mounting bracket arm 104) in either a front-facing-forward or a rear-facing-forward configuration without removing the affixed first and second mounting bracket arms 102 and 104 from the rack housing assembly.

Coupling means 118 may include, but may not be limited to universal joints, tongue and grove joints, welded joints, wedged joints or other types of means known in the art. In addition, coupling means 118 may include, but not be limited to, the use of screws, bolts, nuts, clamps, pins, rivets, adhesives and the like. Frame member 106 is preferably provided for supporting a plurality of electrical cabling for either a front-facing-forward-electronic component or a rear-facing-forward electronic component thereby reducing the weight strain of the cabling on the electronic component's cabling interfaces. In addition, the apparatus may further include optional bracing so that the rack is strengthened for use in areas prone to seismic occurrences.

Figure 2:
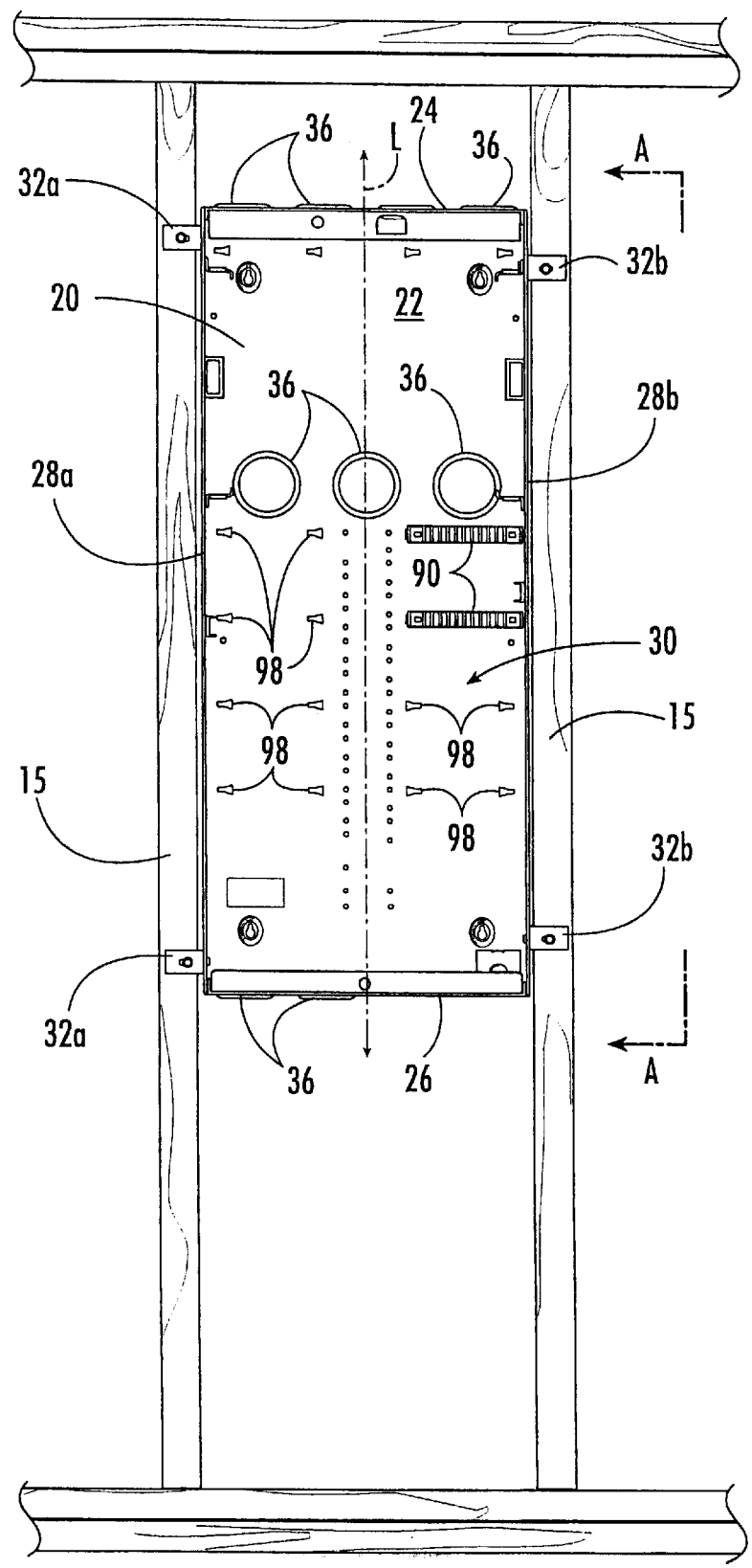
FIG. 2 is a perspective view of the preferred embodiment of the modular bracket for an electronic component according to the present invention, wherein a rear-facing-forward electronic component may be affixed.

Referring next to FIG. 2, depicted is modular equipment rack bracket 100 for mounting electronic equipment in a rear-facing-forward position including first mounting bracket arm 102 and second mounting bracket arm 104 for mounting to a housing rack assembly (not shown) and frame member 106 for supporting a plurality of electrical supply cabling, signal cabling or data cabling and the like (not shown). First mounting bracket arm 102 and second mounting bracket arm 104 each comprise front end 108, 112, respectively and back end 110, 114, respectively. Front end 108 of first mounting bracket arm 102 and front end 112 of second mounting bracket arm 104 are affixed via connecting means 122, for example, perpendicularly to the front of the housing rack assembly thereby allowing first mounting bracket arm 102 and second mounting bracket arm 104 to extend inwardly within the housing rack assembly. First and second mounting bracket arms 102, 104 respectively have associated therewith a plurality of fastener openings 116 for attaching any of a multitude of electronic components thereto in either a front-facing-forward or rear-facing-forward configuration. The fastener openings 116 may be compatible with all types of screws, bolts, nuts, clamps, pins, rivets, adhesives and the like. Although fastener openings 116 are utilized in the preferred embodiment, it is foreseeable that additional fastening means such as universal joints, tongue and grove joints, welded joints, wedged joints and the like may be an integral part of first and second mounting bracket arms 102 and 104. In addition, first and second mounting bracket arm 102 and 104 may comprise a plurality of coupling means 118 for affixing frame member 106 thereto. Frame member 106 is coupled, for example, perpendicularly to one of a plurality of coupling means 118 of first and second mounting bracket arms 102 and 104 allowing the electronic component to be affixed therein (i.e., between first mounting bracket arm 102 and second mounting bracket arm 104) in either a front-facing-forward or a rear-facing-forward configuration without removing the affixed first and second mounting bracket arms 102 and 104 from the rack housing assembly.

Coupling means 118 may include, but may not be limited to universal joints, tongue and grove joints, welded joints, wedged joints or other types of means known in the art. In addition, coupling means 118 may include, but not be limited to, the use of screws, bolts, nuts, clamps, pins, rivets, adhesives and the like. Frame member 106 is preferably provided for supporting a plurality of electrical cabling for either a front-facing-forward electronic component or a rear-facing-forward electronic component thereby reducing the weight strain of the cabling on the electronic component's cabling interfaces. In addition, the apparatus may further include optional bracing so that the rack is strengthened for use in areas prone to seismic occurrences.

Figure 3:
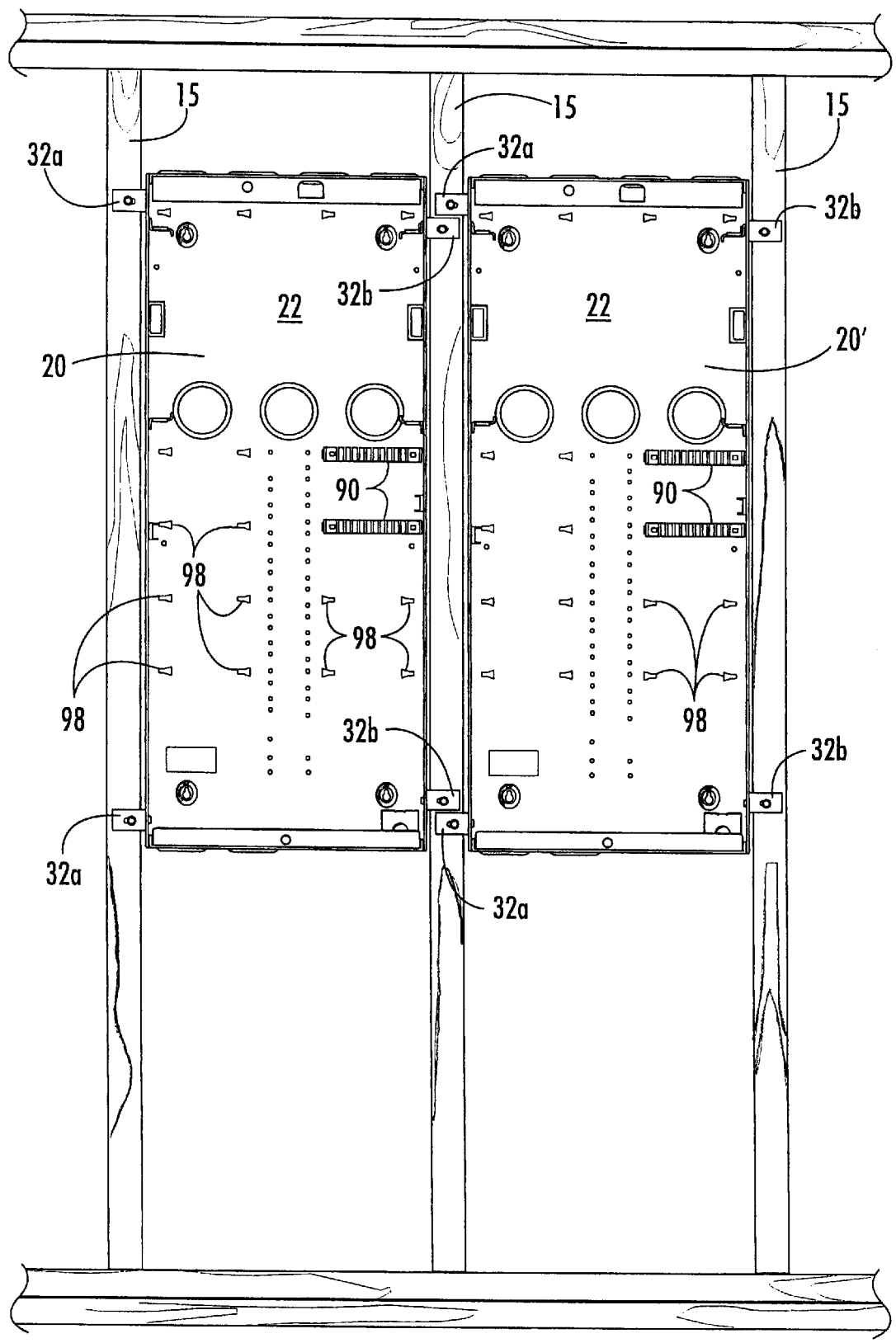
FIG. 3 is a perspective view of the modular rack bracket of FIG. 1 wherein a front-facing-forward electronic component is affixed to the apparatus.

Referring next to FIG. 3, depicted is modular equipment rack bracket 100 shown in FIG. 1 having electronic equipment 120 mounted therein in a front-facing-forward position. As described above with respect to FIG. 1, modular rack bracket 100 comprises first and second mounting bracket arms 102 and 104 for mounting to a housing rack assembly (not shown) and frame member 106 for supporting a plurality of electrical supply cabling, signal cabling or data cabling and the like (not shown). First and second mounting bracket arms 102 and 104 each comprise front end 108, 112 respectively, and back end 110, 114 respectively. Front end 108 of first mounting bracket arm 102 and front end 112 of second mounting bracket arm 104 are affixed via connecting means 122, for example, perpendicular to the front of the housing rack assembly thereby allowing first and second mounting bracket arms 102 and 104 to extend inwardly within the housing rack assembly. First and second mounting bracket arms 102 and 104 also may have associated therewith a plurality of fastener openings 116 for attaching electronic component 120 thereto. In addition, the first and second mounting bracket arms 102 and 104 may comprise a plurality of coupling means 118 for affixing frame member 106 thereto. Frame member 106 is then coupled, for example, perpendicular to at least one of coupling means 118 of each of first and second mounting bracket arms 102 and 104. Preferably, frame member 106 is provided for supporting a plurality of electrical cabling thereby reducing the weight strain of the cabling on the electronic component's cabling interfaces.

Figure 4B:
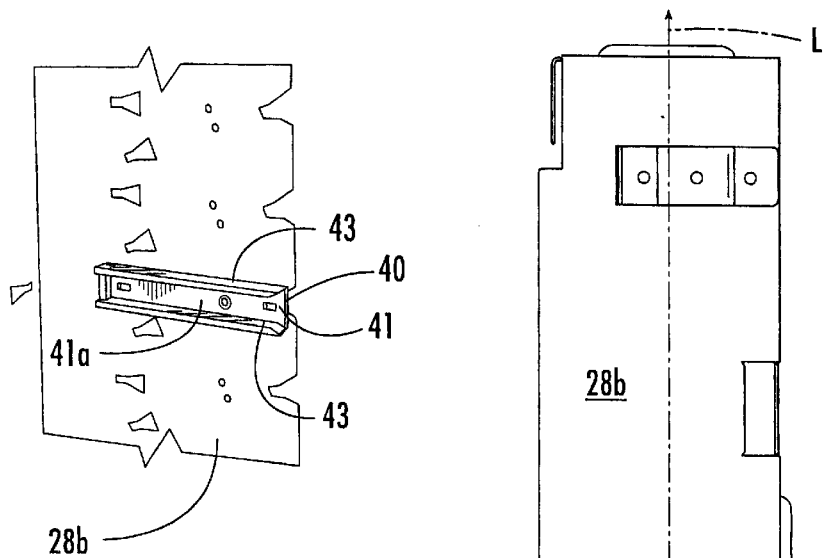
FIG. 4 is a perspective view of the modular rack bracket of FIG. 2 wherein a rear-facing-forward electronic component is affixed to the apparatus.
Figure 4A:
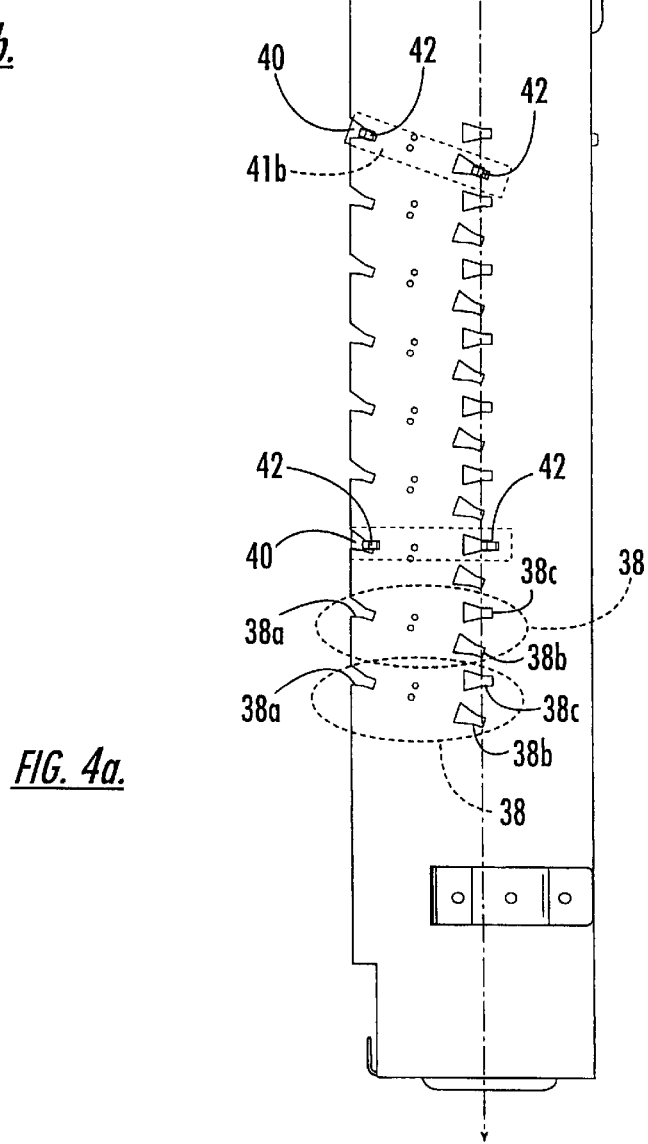

Referring next to FIG. 4, depicted is modular equipment rack bracket 100 shown in FIG. 1 having electronic equipment 120 mounted therein in a rear-facing-forward position. As described above with respect to FIG. 1, modular rack bracket 100 comprises first and second mounting bracket arms 102 and 104 for mounting to a housing rack assembly (not shown) and frame member 106 for supporting a plurality of electrical supply cabling, signal cabling or data cabling and the like (not shown). First and second mounting bracket arm 102 and 104 each comprise front end 108, 112 respectively, and back end 110, 114 respectively. Front end 108 of first mounting bracket arm 102 and front end 112 of second mounting bracket arm 104 are affixed via connecting means 122, for example, perpendicular to the front of the housing rack assembly thereby allowing first and second mounting bracket arms 102 and 104 to extend inwardly within the housing rack assembly. First and second mounting bracket arm 102 and 104 also may have associated therewith a plurality of fastener openings 116 for attaching electronic component 120 thereto. In addition, the first and second mounting bracket arms 102 and 104 may comprise a plurality of coupling means 118 for affixing frame member 106 thereto. Frame member 106 is then coupled, for example, perpendicular to at least one of coupling means 118 of each of first and second mounting bracket arms 102 and 104. Preferably, frame member 106 is provided for supporting a plurality of electrical cabling thereby reducing the weight strain of the cabling on the electronic component's cabling interfaces.

Figure 5:
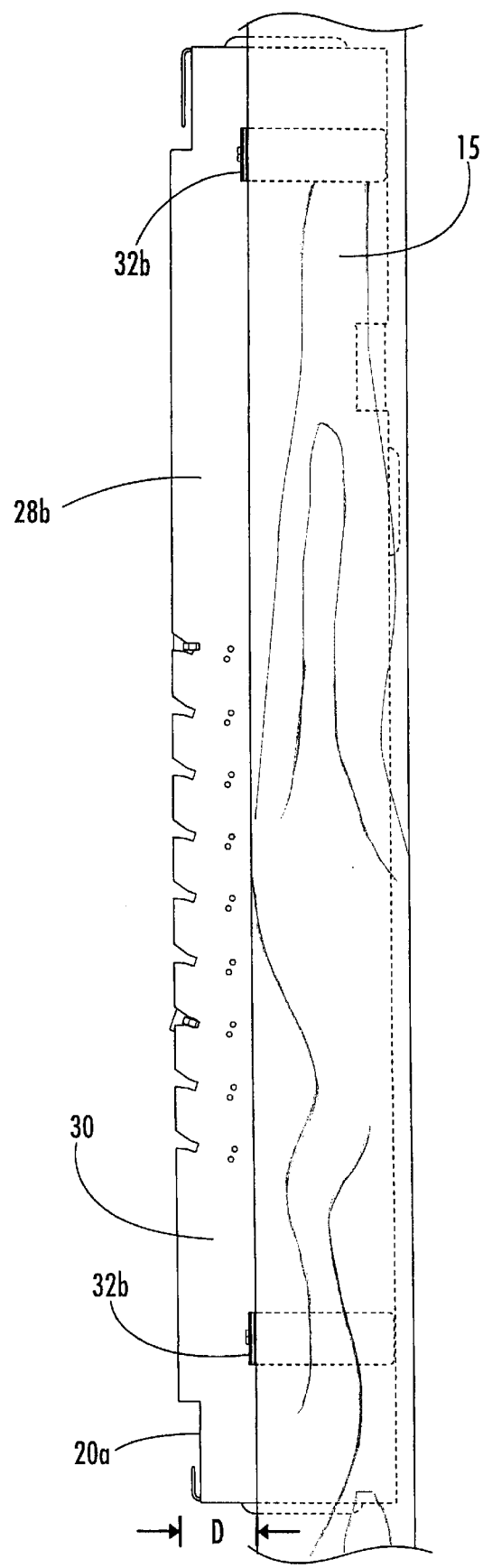
FIG. 5 is a side view of one of the mounting bracket arms of the modular rack bracket shown in FIGS. 1 and 2.

Referring next to FIG. 5, depicted is a side view of first mounting bracket arm 102. Preferably, front end 108 of first mounting bracket arm 102 is positioned, for example, such that it is perpendicular to the front of a housing rack assembly thereby allowing first mounting bracket arm 102 to extend inwardly within a housing rack assembly. Also first mounting bracket arm 102 may have associated therewith a plurality of fastener openings 116 for attaching any of a multitude of electronic components thereto in either a front-facing-forward or a rear-facing-forward configuration. Fastener openings 116 may be compatible with all types of screws, bolts, nuts, clamps, pins, rivets, adhesives and the like. Although fastener openings 116 are utilized in the preferred embodiment, it is foreseeable that additional fastening means such as universal joints, tongue and grove joints, welded joints, wedged joints and the like may be used with the first and second mounting bracket arms 102 and 104 for attaching the electronic components thereto. Furthermore, the arrangement of fastener openings 116 or other fastening means may be altered to accommodate a plurality of electronic components. In addition, first mounting bracket arm 102 preferably comprises a plurality of coupling means 118 for attaching frame member 106 thereto in a perpendicular position. In the preferred embodiment, second mounting bracket arm 104 is a symmetrical counterpart to first mounting bracket arm 102 shown in FIG. 5.

Figure 6:
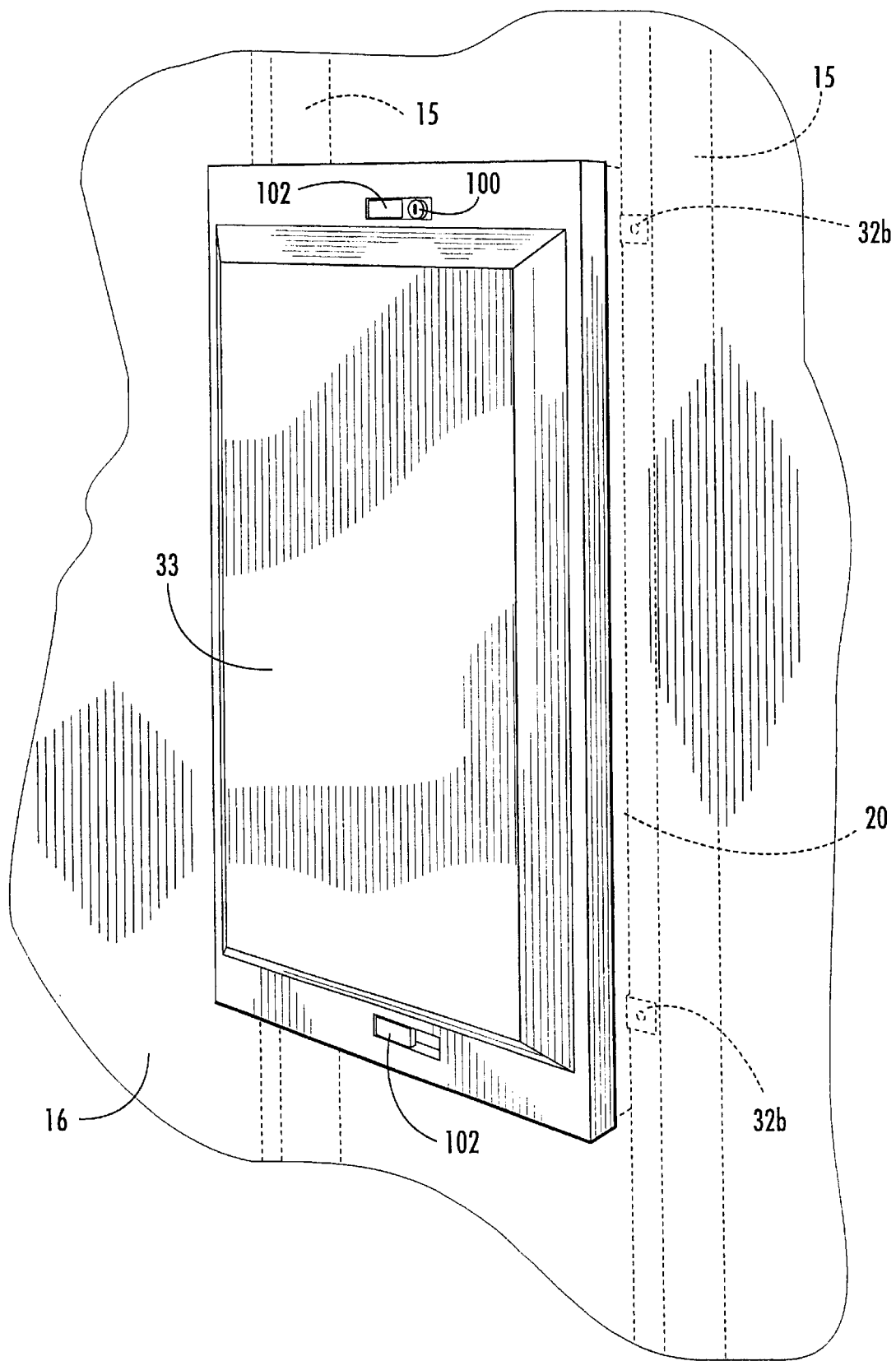
FIG. 6 is an exploded perspective view of the modular rack bracket of FIG. 3 showing the means for attaching a plurality of types of electronic components and the means for coupling the frame member to the mounting bracket arms.

Turning next to FIG. 6, depicted is an exploded perspective view of modular equipment rack bracket 100 shown in FIG. 3, further showing the attachment of electronic component 120 to first mounting bracket arm 102 using screws 117. Of course other types of fasteners may be used. Also shown is coupling means 118 for coupling frame member 106 to first and second mounting bracket arms 102 and 104. Although numerous types of attachment means (i.e., screws 117 through fastener openings 116) and coupling means 118 are known in the art, depicted in the preferred embodiment is a screw-type assembly for attachment means 116 and tongue and grove joints fastened by a screw-type connection for coupling means 118.

Figure 7:
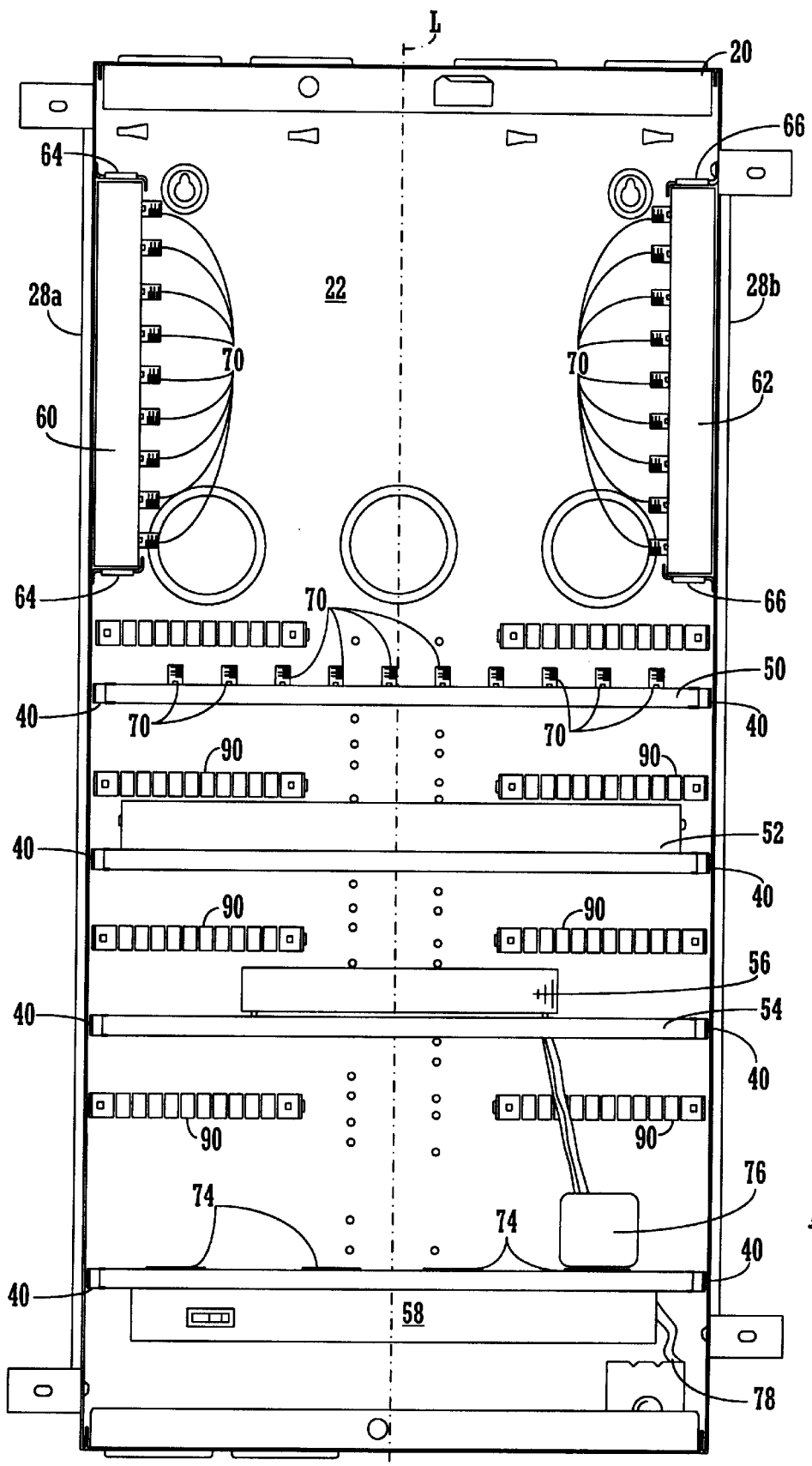
FIG. 7 is a perspective view of a housing rack system employing multiple modular rack brackets according to the present invention having either a front-facing-forward or a rear-facing-forward electronic component affixed therein.
Figure 8:
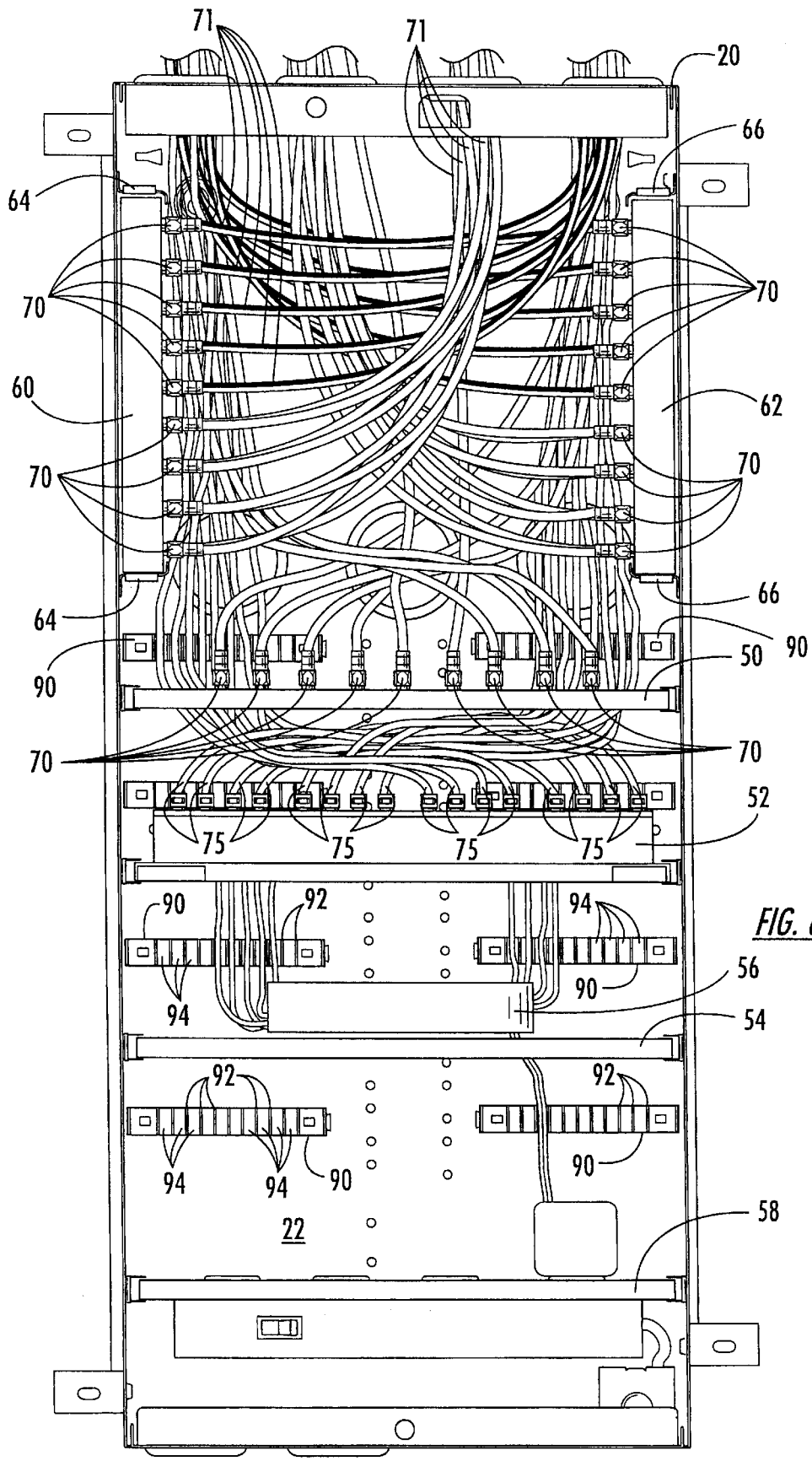
Figure 9:
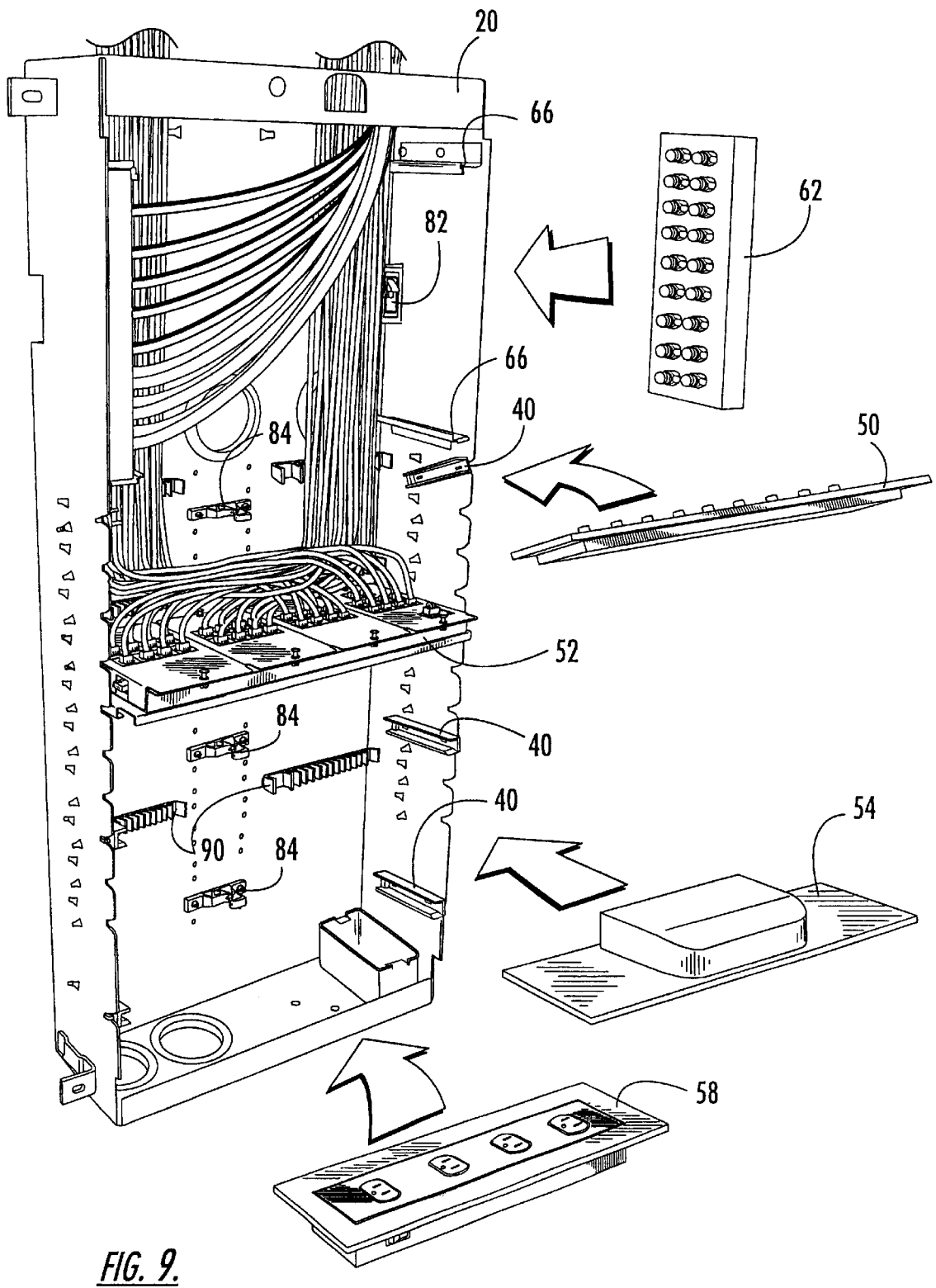
Figure 10:
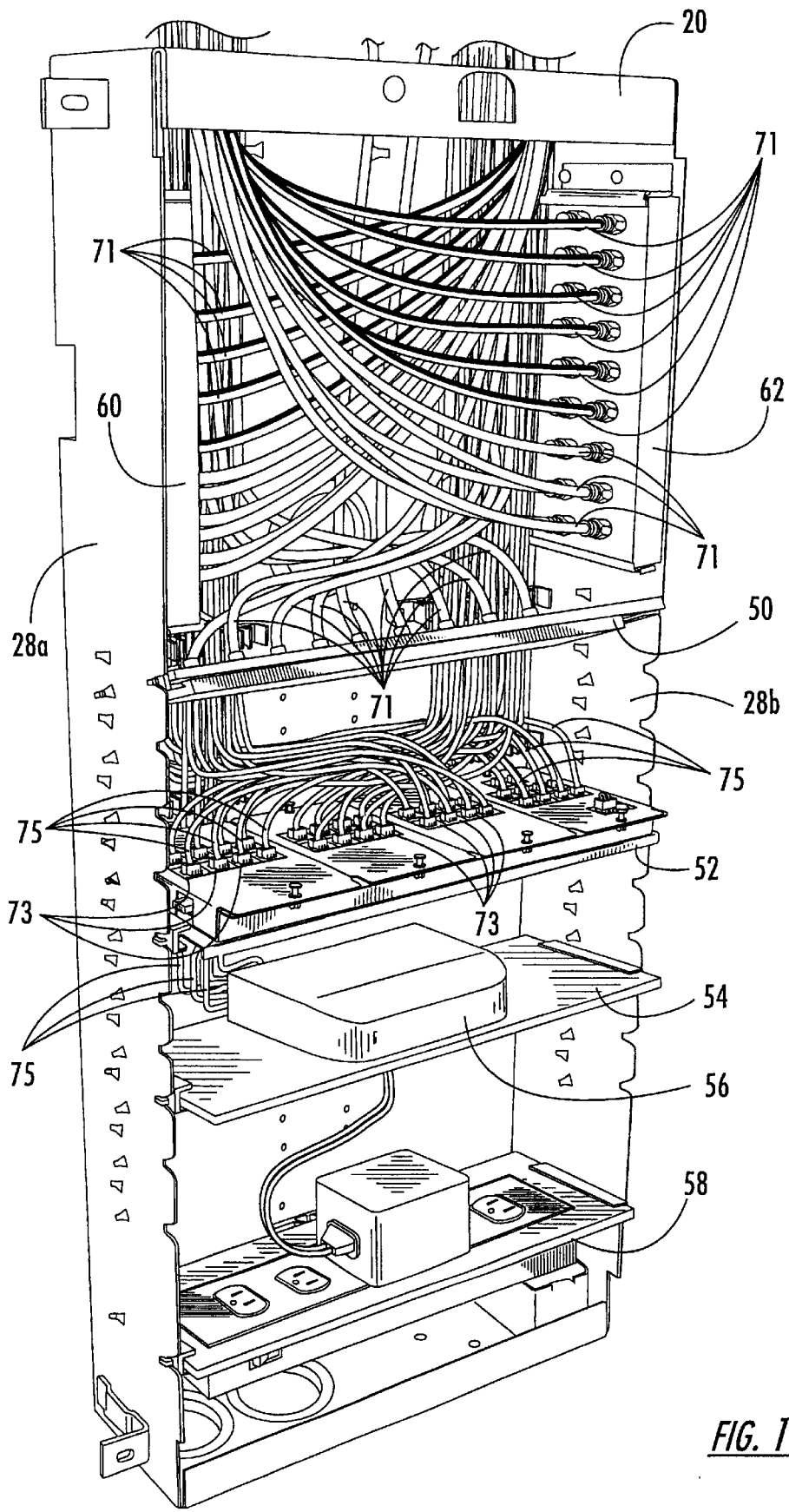
Figure 11:
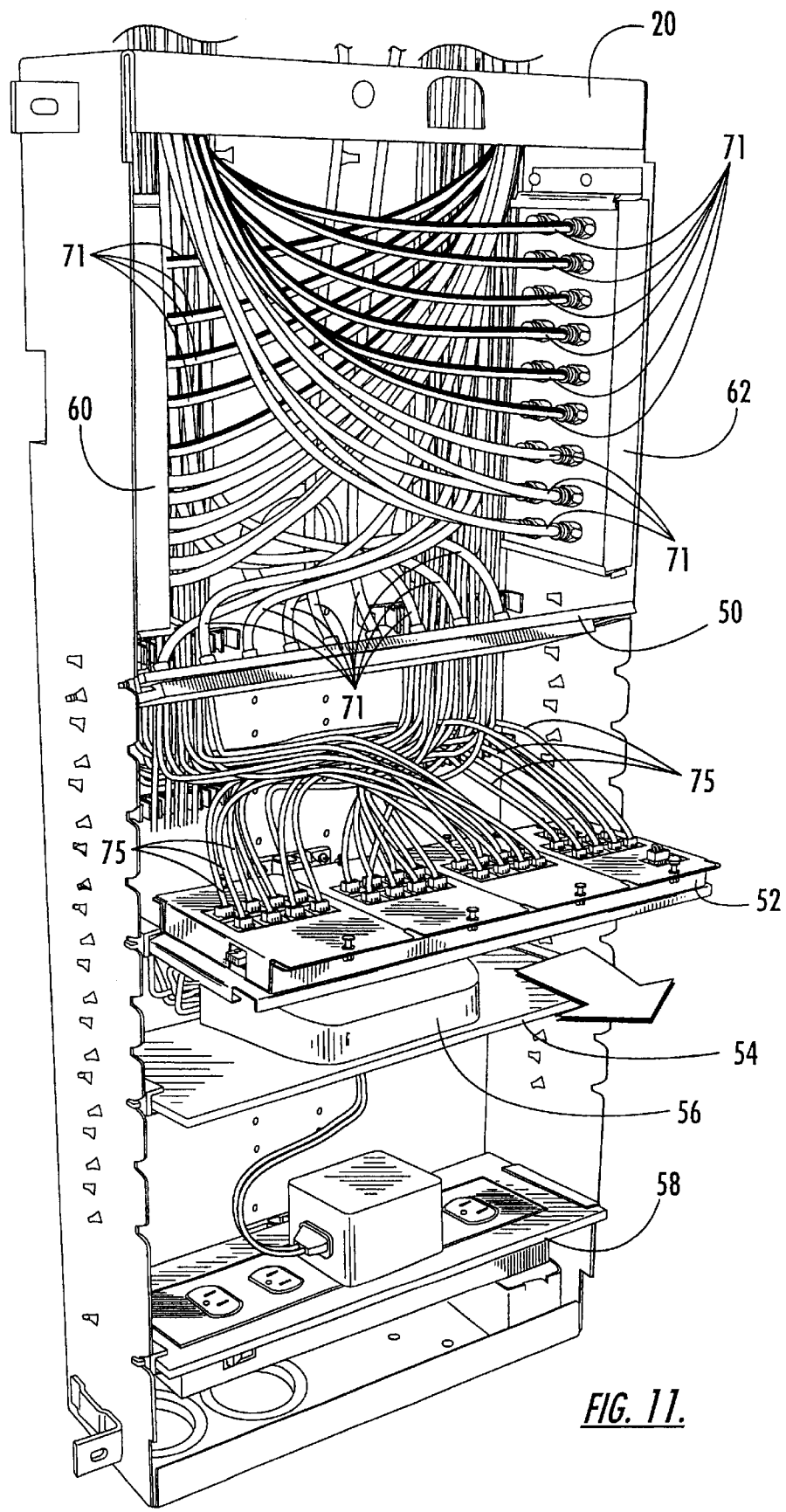
Figure 12:
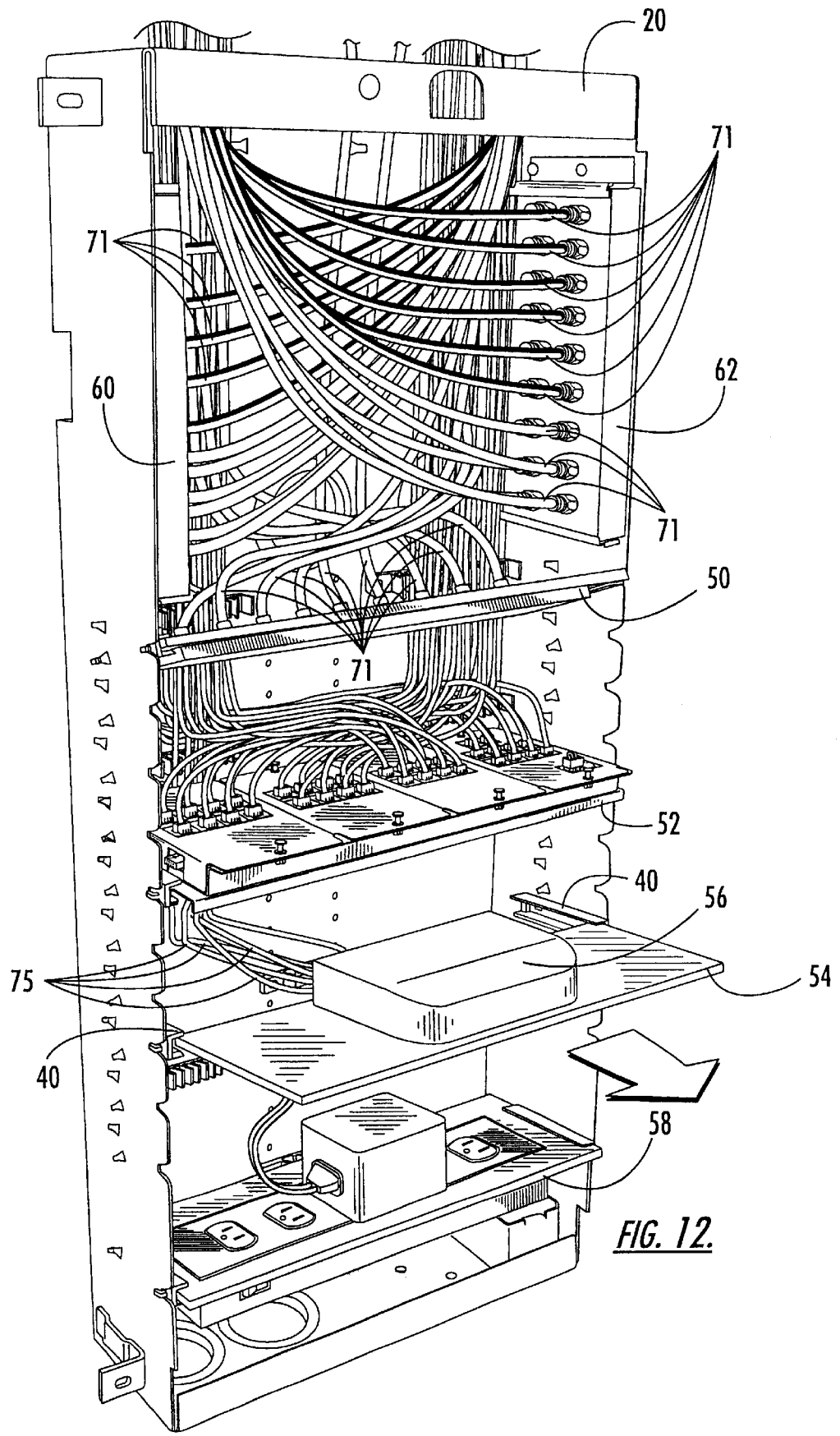
Figure 13:
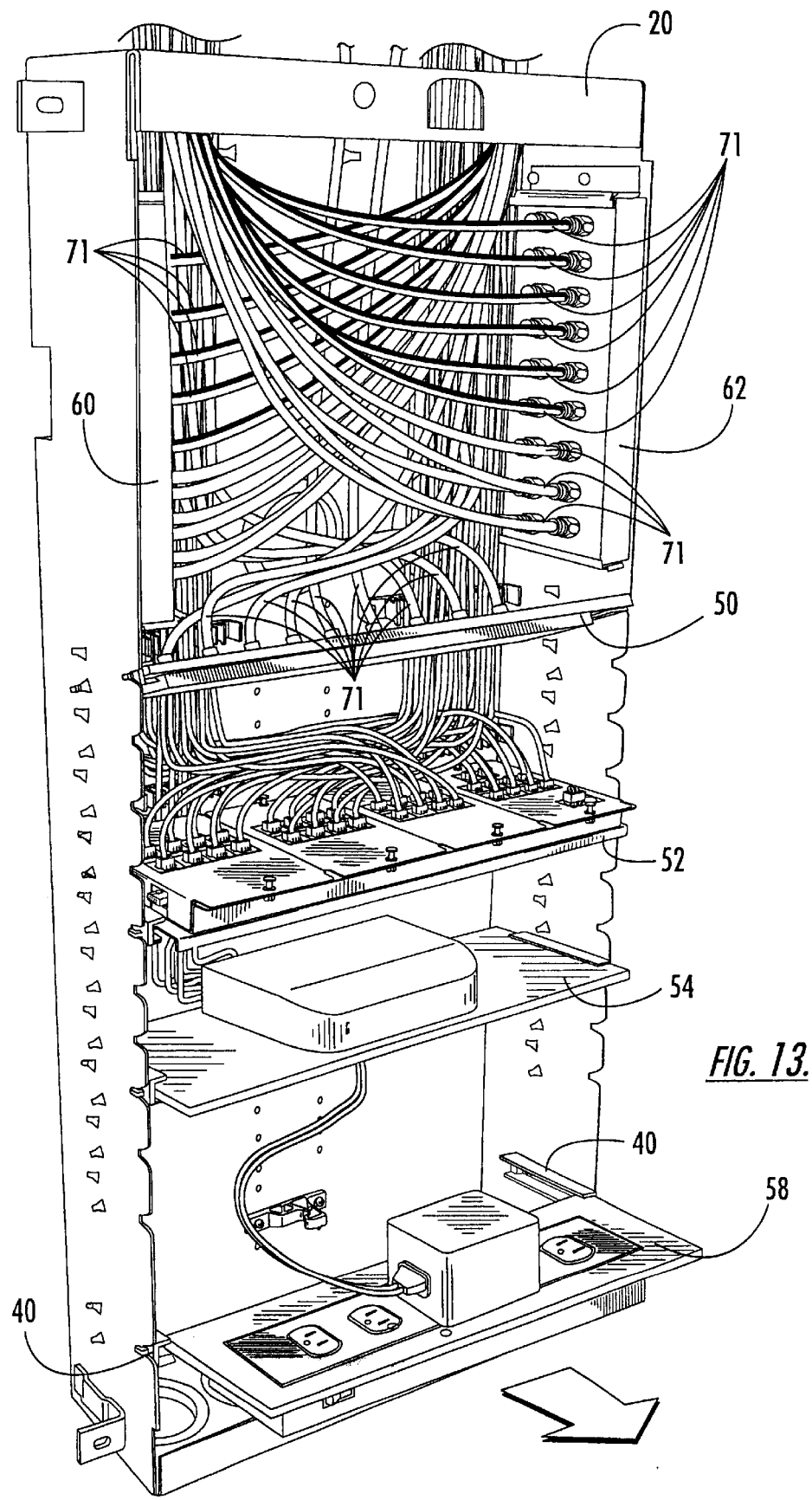
Figure 14:
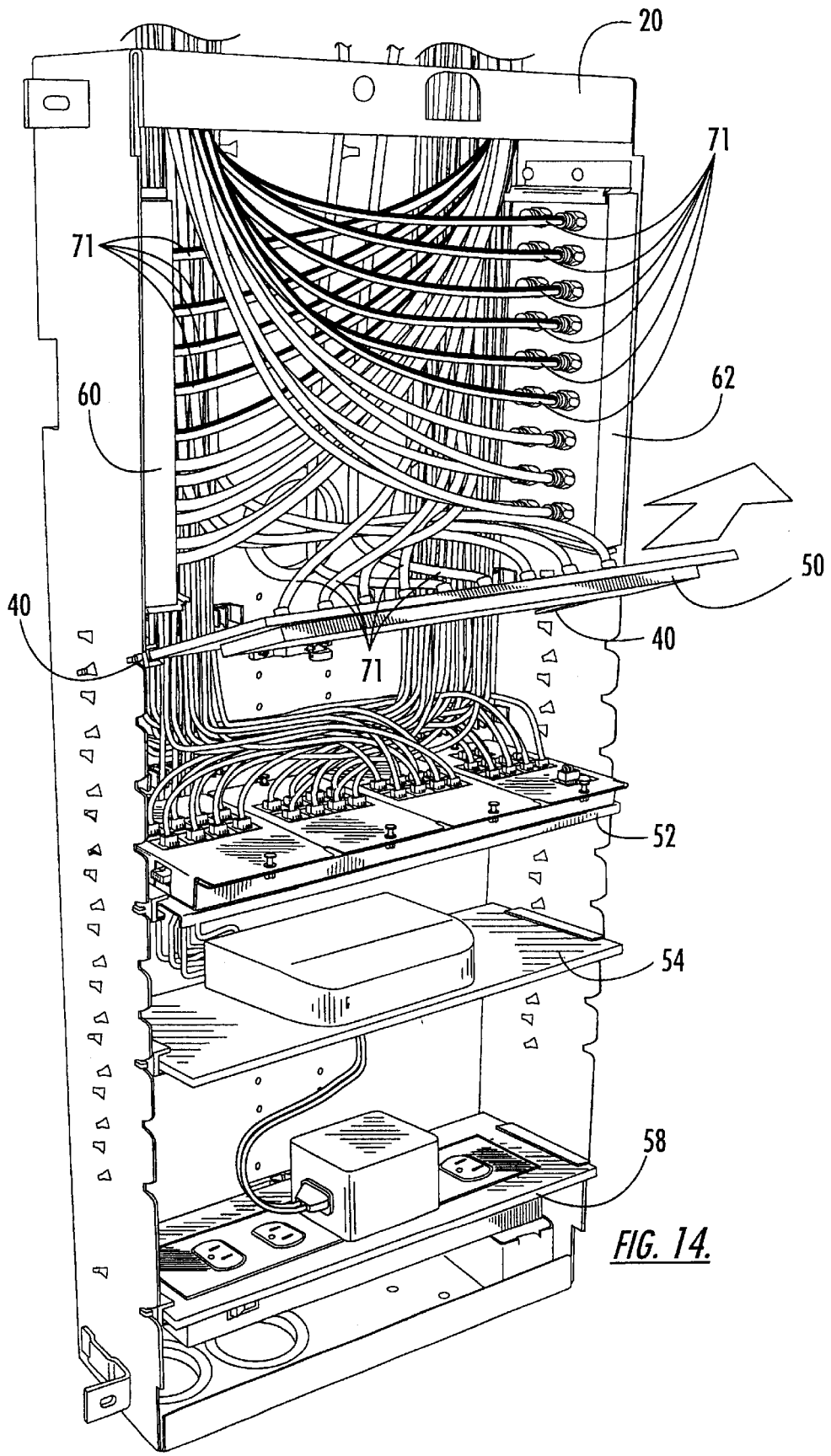
Figure 15:
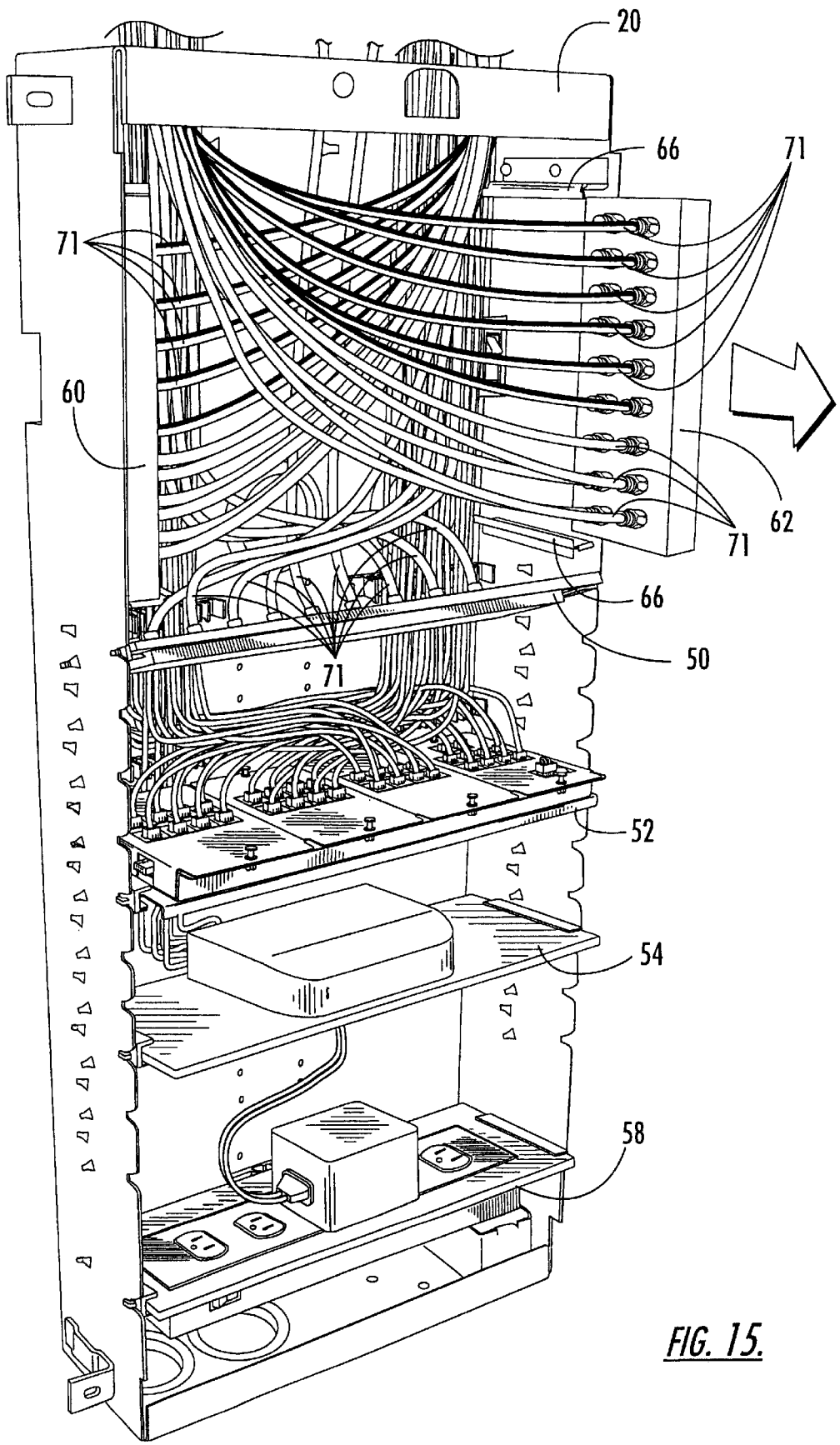
Figure 16:
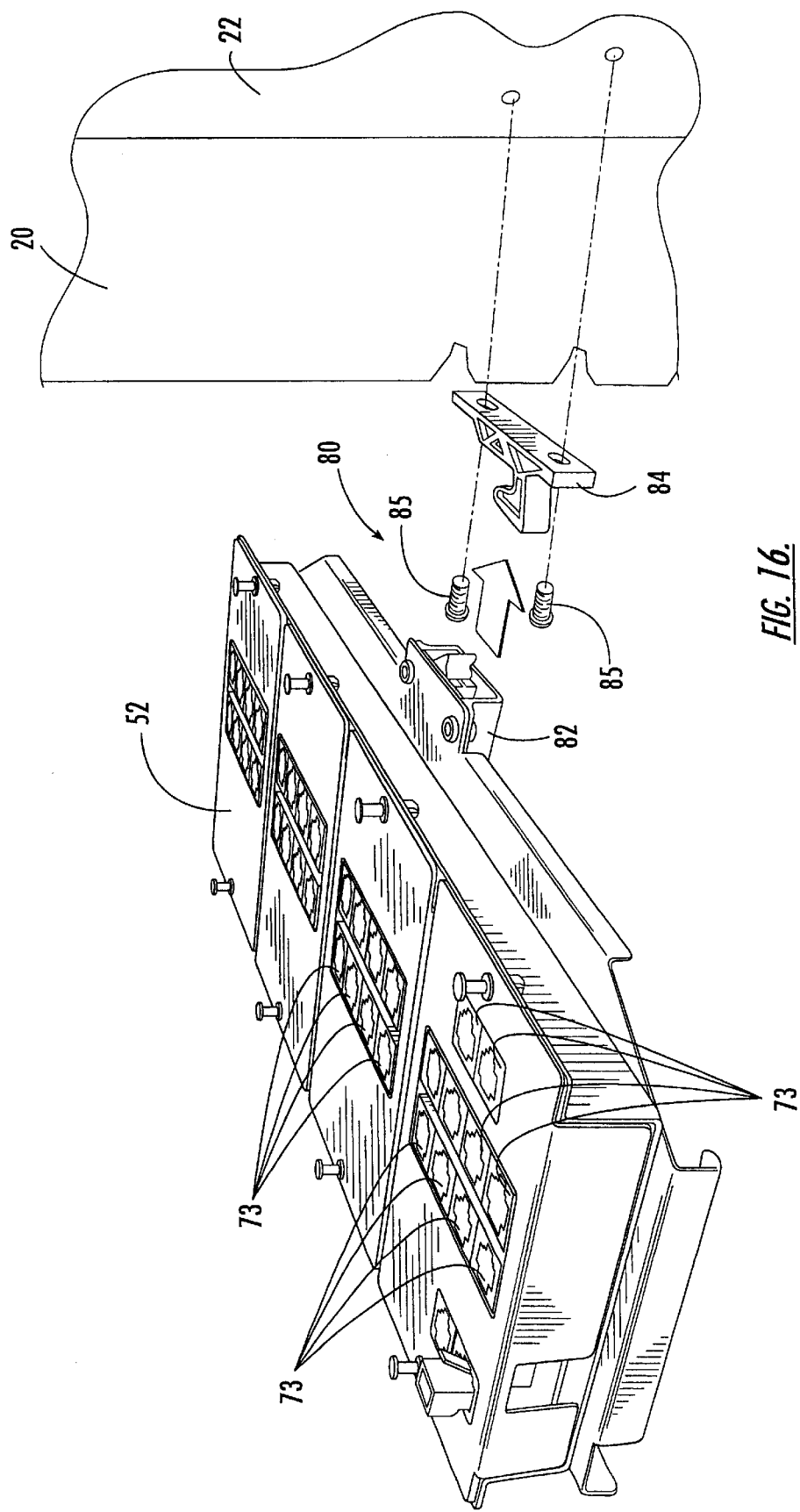
Figure 17:
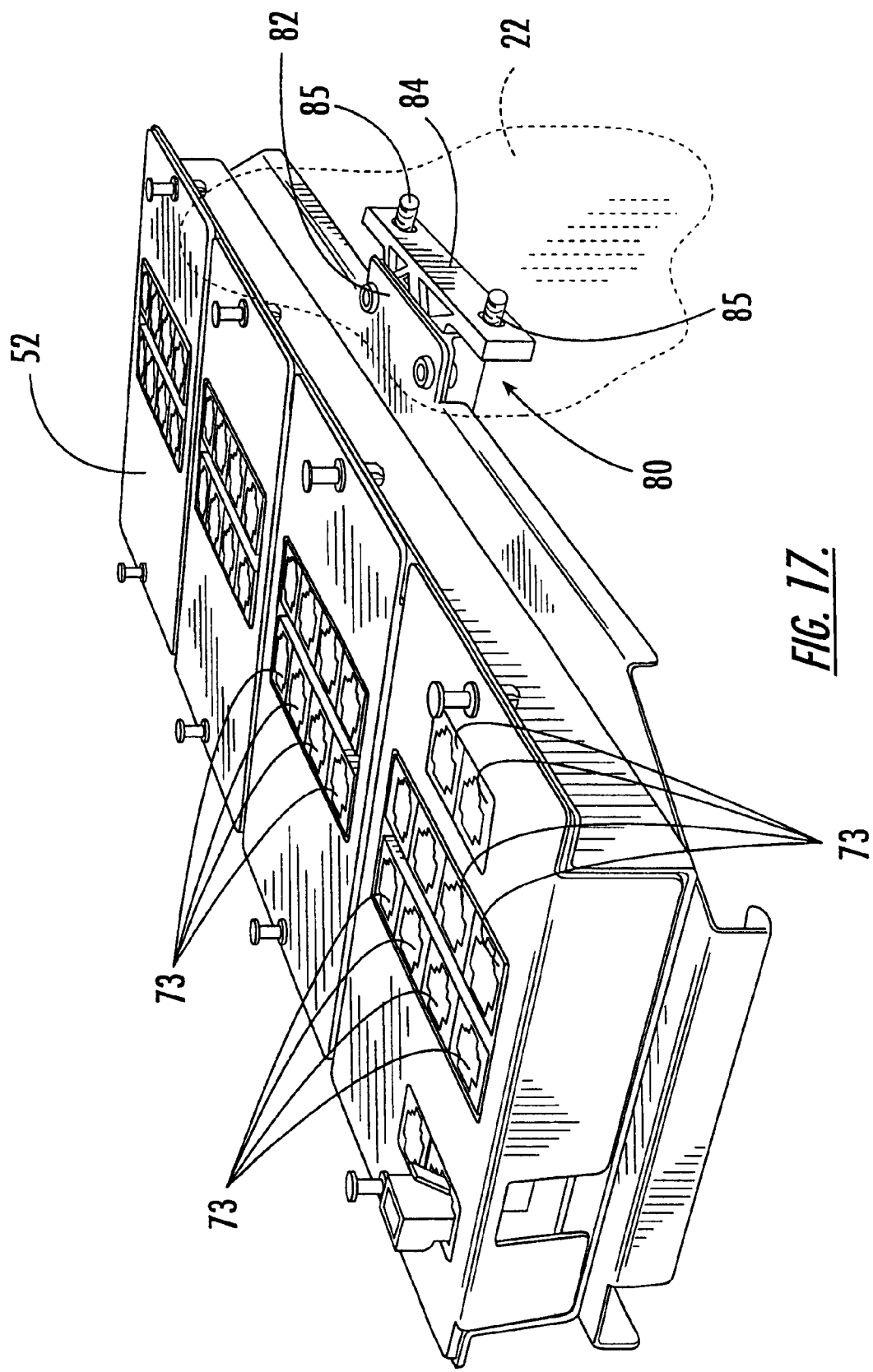
Figure 18:
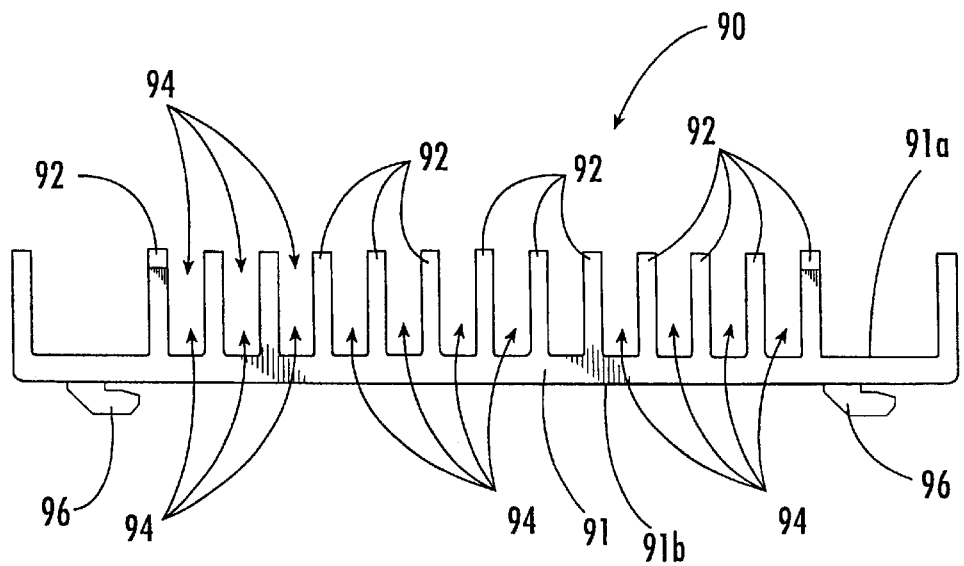
Figure 19:
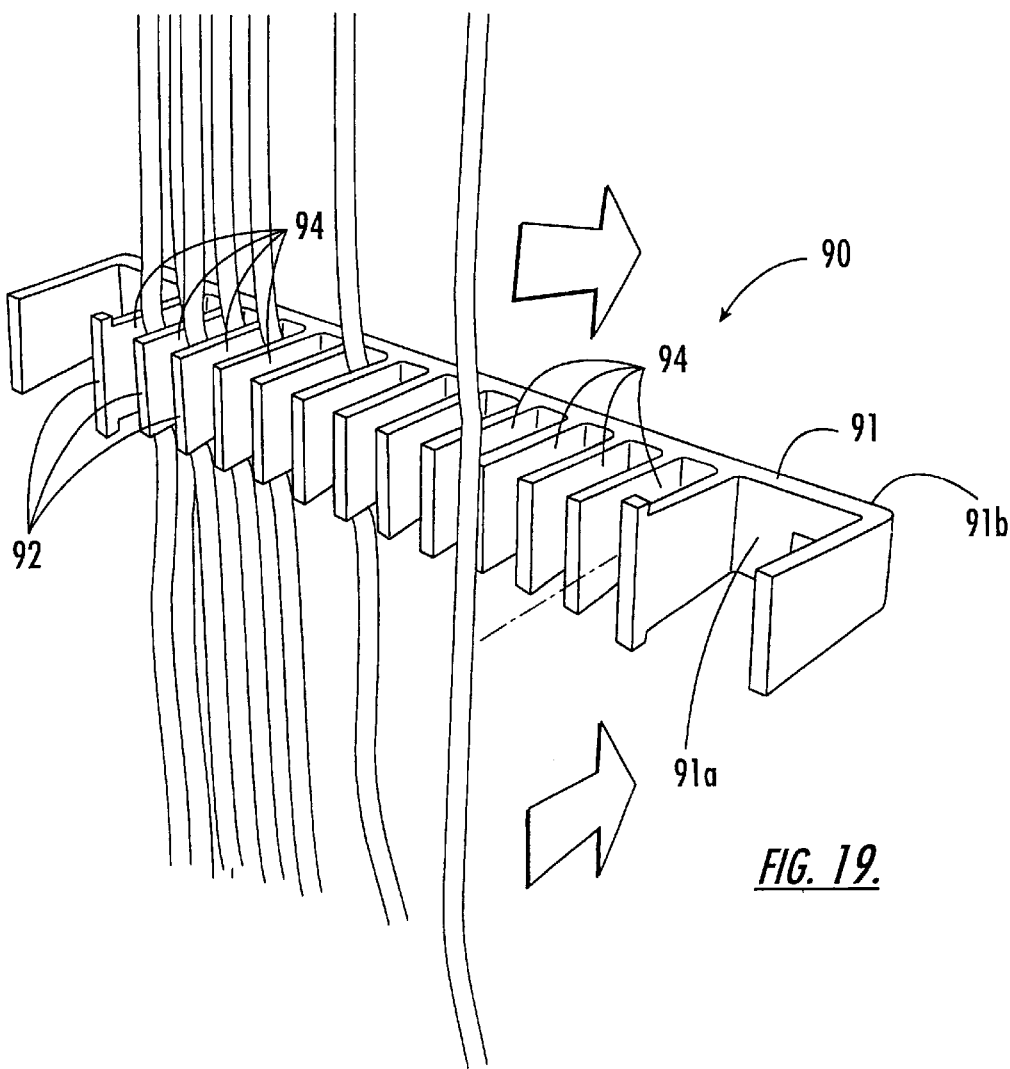

Referring next to FIG. 7, depicted is a perspective view of housing rack system 700 employing several modular equipment rack brackets 702, 704, 706 and 708 and attached electronic components 703, 705, 707 and 709 affixed to a standard housing rack system 700. In accordance with the preferred embodiment of the modular equipment rack bracket of the invention, numerous electronic components may be configured in spaced parallel relationship dependant on the size of the electronic components as well as the size of the housing rack system. Furthermore, in accordance with the invention, several modular rack brackets (e.g., brackets 702 and 706) and their attached electronic components (e.g., components 703 and 707) may be easily affixed to housing rack system 700. Furthermore, as depicted, once modular rack brackets 702 and 706 are mounted, they are positioned such that they extend inward of housing rack 700, as shown by modular rack brackets 704 and 708. As shown, modular rack brackets 702 and 704 are attached in a front-facing-forward position, each having an electronic component positioned therein. Also, modular rack bracket 706 and 708 are shown as attached in a rear-facing-forward position each having an electronic component positioned therein.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

That which is claimed is:
1. A cable distribution apparatus, comprising:
   a housing, comprising a rear wall joined to a forwardly projecting top wall, bottom wall and pair of side walls to define a forwardly open chamber, wherein at least one of the rear wall, top wall, bottom wall, and sides walls includes one or more apertures formed therein;
   a first cable distribution module slidably secured within the chamber, wherein the cable distribution module comprises a plurality of jacks adapted to receive a respective plurality of communications cables extending into the chamber via one or more of the apertures;
   a locking mechanism configured to releasably secure the cable distribution module within the chamber;
   an electrical power module slidably secured within the chamber, wherein the electrical power module comprises one or more electrical outlets, wherein each electrical outlet is adapted to receive a power cord or adapter from electrical equipment disposed within the chamber; and
   a third locking mechanism configured to releasably secure the electrical power module within the chamber.
2. The cable distribution apparatus according to claim 1, wherein the cable distribution module is slidably secured within the chamber via a pair of guides, wherein each one of the pair of guides is removably secured to a respective one of the housing side walls.
3. The cable distribution apparatus according to claim 2, wherein orientation of the pair of guides within the chamber is adjustable such that the cable distribution module can be slidably secured within the chamber at more than one angle relative to the rear wall.
4. The cable distribution apparatus according to claim 1, wherein the locking mechanism is configured to releasably secure the cable distribution module to the housing rear wall.
5. The cable distribution apparatus according to claim 1, further comprising:

a second cable distribution module slidably secured to only one of the slide walls within the chamber, wherein the second cable distribution module comprises a plurality of jacks adapted to receive a respective plurality of communications cables extending into the interior chamber via one or more of the apertures; and a second locking mechanism configured to releasably secure the second cable distribution module within the chamber.

6. The cable distribution apparatus according to claim 1, wherein the electrical power module is slidably secured within the chamber via a pair of guides, wherein each one of the pair of guides is removably secured to a respective one of the housing side walls.

7. The cable distribution apparatus according to claim 6, wherein orientation of the pair of guides within the chamber is adjustable such that the electrical power module can be slidably secured within the chamber at more than one angle relative to the rear wall.

8. The cable distribution apparatus according to claim 1, wherein the third locking mechanism is configured to releasably secure the electrical power module to the housing rear wall.

9. The cable distribution apparatus according to claim 1, further comprising at least one cable comb secured within the housing, wherein each cable comb comprises a plurality of adjacent, spaced-apart members that define respective cable receptacles, and wherein each cable receptacle is configured to retain at least two communications cables therein in single row alignment.

10. The cable distribution apparatus according to claim 1, further comprising a cover removably secured to the housing, wherein the cover is configured to enclose the chamber.

11. The cable distribution apparatus according to claim 10, wherein the cover comprises a locking device that locks the cover to the housing.

12. The cable distribution apparatus according to claim 1, wherein each side wall has an inner and outer surface, and wherein one or more mounting ears extend outwardly from the outer surface of each side wall, wherein the mounting ears are configured to support the housing from building wall framing.

13. The cable distribution apparatus according to claim 1, further comprising:
a tray slidably secured within the chamber, wherein the tray is configured to support electronic equipment thereon; and
a fourth locking mechanism configured to releasably secure the tray within the chamber.

14. A cable distribution apparatus, comprising:
an elongated housing that defines a longitudinal direction, comprising a rear wall joined to a forwardly projecting top wall, bottom wall and pair of side walls to define a forwardly open chamber, wherein at least one of the rear wall, top wall, bottom wall, and sides walls includes one or more apertures formed therein;
a pair of guides, wherein each one of the pair of guides is secured to a respective one of the housing side walls;
a first cable distribution module slidably secured within the chamber via the pair of guides, wherein the cable distribution module comprises a plurality of jacks adapted to receive a respective plurality of communications cables extending into the chamber via one or more of the apertures;
a locking mechanism configured to releasably secure the cable distribution module to the housing rear wall within the chamber;

a second pair of guides, wherein each one of the second pair of guides is secured to a respective one of the housing side walls in longitudinally spaced-apart relationship with the first pair of guides;
an electrical power module slidably secured within the chamber via the second pair of guides, wherein the electrical power module comprises one or more electrical outlets, wherein each electrical outlet is adapted to receive a power cord or adapter from electrical equipment disposed within the chamber; and
a third locking mechanism configured to releasably secure the electrical power module to the housing rear wall within the chamber.

15. The cable distribution apparatus according to claim 14, further comprising:
a second cable distribution module slidably secured to only one of the side walls within the chamber, wherein the second cable distribution module comprises a plurality of jacks adapted to receive a respective plurality of communications cables extending into the chamber via one or more of the apertures; and
a second locking mechanism configured to releasably secure the second cable distribution module to the housing rear wall within the chamber.

16. The cable distribution apparatus according to claim 14, wherein orientation of the pair of guides within the chamber is adjustable such that the cable distribution module can be slidably secured within the chamber at more than one angle relative to the rear wall.

17. The cable distribution apparatus according to claim 14, wherein orientation of the second pair of guides within the chamber is adjustable such that the electrical power module can be slidably secured within the chamber at more than one angle relative to the rear wall.

18. The cable distribution apparatus according to claim 14, further comprising at least one cable comb secured within the housing, wherein each cable comb comprises a plurality of adjacent, spaced-apart members that define respective cable receptacles, and wherein each cable receptacle is configured to retain at least two communications cables therein in single row alignment.

19. The cable distribution apparatus according to claim 14, further comprising a cover removably secured to the housing, wherein the cover is configured to enclose the chamber.

20. The cable distribution apparatus according to claim 14, wherein each side wall has an inner and outer surface, and wherein one or more mounting ears extend outwardly from the outer surface of each side wall, wherein the mounting ears are configured to support the housing from building wall framing.

21. The cable distribution apparatus according to claim 14, further comprising:
a tray slidably secured within the chamber, wherein the tray is configured to support electronic equipment thereon; and
a fourth locking mechanism configured to releasably secure the tray within the chamber.

22. A cable distribution apparatus, comprising:
an elongated housing that defines a longitudinal direction, comprising a rear wall joined to a forwardly projecting top wall, bottom wall and pair of side walls to define a forwardly open chamber, wherein at least one of the rear wall, top wall, bottom wall, and sides walls includes one or more apertures formed therein;
a video cable distribution module slidably secured within the chamber, wherein the video cable distribution module comprises a plurality of jacks adapted to receive a respective plurality of video cables extending into the chamber via one or more of the apertures;

a first locking mechanism configured to releasably secure the video cable distribution module within the chamber;

a telecommunications cable distribution module slidably secured within the chamber in longitudinally spaced-apart relationship with the video cable distribution module, wherein the telecommunications cable distribution module comprises a plurality of jacks adapted to receive a respective plurality of telecommunications cables extending into the chamber via one or more of the apertures;

a second locking mechanism configured to releasably secure the telecommunications cable distribution module within the chamber;

an electrical power module slidably secured within the chamber in longitudinally spaced-apart relationship with the video cable distribution module and the telecommunications cable distribution module, wherein the electrical power module comprises one or more electrical outlets, wherein each electrical outlet is adapted to receive a power cord or adapter from electrical equipment disposed within the chamber, and wherein the electrical power module receives electrical power via an electrical power cable that extends into the chamber via one or more of the apertures; and a third locking mechanism configured to releasably secure the electrical power module within the chamber.

23. The cable distribution apparatus according to claim 23, wherein the video cable distribution module is slidably secured within the chamber via a first pair of adjustable guides, wherein each one of the first pair of guides is adjustably secured to a respective one of the housing side walls such that the video cable distribution module can be slidably secured within the chamber at more than one angle relative to the housing rear wall.

24. The cable distribution apparatus according to claim 22, wherein the telecommunications cable distribution module is slidably secured within the chamber via a second pair of adjustable guides, wherein each one of the second pair of guides is adjustably secured to a respective one of the housing side walls such that the telecommunications cable distribution module can be slidably secured within the chamber at more than one angle relative to the housing rear wall.

25. The cable distribution apparatus according to claim 22, wherein the electrical power distribution module is slidably secured within the chamber via a third pair of adjustable guides, wherein each one of the third pair of guides is adjustably secured to a respective one of the housing side walls such that the electrical power distribution module can be slidably secured within the chamber at more than one angle relative to the housing rear wall.

26. The cable distribution apparatus according to claim 22, further comprising at least one cable comb secured within the housing, wherein each cable comb comprises a plurality of adjacent, spaced-apart members that define respective cable receptacles, and wherein each cable receptacle is configured to retain at least two communications cables therein in single row alignment.

27. The cable distribution apparatus according to claim 22, further comprising a cover removably secured to the housing, wherein the cover is configured to enclose the chamber.

28. The cable distribution apparatus according to claim 22, wherein each side wall has an inner and outer surface, and wherein one or more mounting ears extend outwardly from the outer surface of each side wall, wherein the mounting ears are configured to support the housing from a building wall.

29. The cable distribution apparatus according to claim 22, further comprising:

a tray slidably secured within the chamber, wherein the tray is configured to support electronic equipment thereon; and a locking mechanism configured to releasably secure the tray within the chamber.

30. A cable distribution system for a building, comprising:

an elongated housing that defines a longitudinal direction, comprising a rear wall joined to a forwardly projecting top wall, bottom wall and pair of side walls to define a forwardly open chamber, wherein at least one of the rear wall, top wall, bottom wall, and sides walls includes one or more apertures formed therein;

a plurality of telecommunications cables, wherein each telecommunications cable has an end that terminates at a respective telecommunications outlet within the building and an opposite end that extends into the housing via an aperture;

a plurality of video cables, wherein each video cable has an end that terminates at a respective video outlet within the building and an opposite end that extends into the housing via an aperture;

a telecommunications cable distribution module slidably secured within the chamber, wherein the telecommunications cable distribution module comprises a plurality of jacks, wherein each jack is adapted to receive an end of one of the telecommunications cables, wherein the telecommunications cable distribution module is slidably secured within the chamber via a first pair of adjustable guides that are configured to allow the telecommunications cable distribution module to be slidably secured within the chamber at more than one angle relative to the housing rear wall;

a video cable distribution module slidably secured within the chamber, wherein the video cable distribution module comprises a plurality of jacks, wherein each jack is adapted to receive an end of one of the video cables, wherein the video cable distribution module is slidably secured within the chamber via a second pair of adjustable guides that are longitudinally spaced-apart from the first pair of adjustable guides and that are configured to allow the video cable distribution module to be slidably secured within the chamber at more than one angle relative to the housing rear wall; and at least one cable comb secured within the housing, wherein each cable comb comprises a plurality of adjacent, spaced-apart members that define respective cable receptacles, and wherein each cable receptacle is configured to retain at least two video cables or telecommunications cables therein in single row alignment.

31. The cable distribution system according to claim 30, further comprising a locking mechanism configured to releasably secure the telecommunications cable distribution module within the chamber.

32. The cable distribution system according to claim 30, further comprising a locking mechanism configured to releasably secure the video cable distribution module within the chamber.

33. The cable distribution system according to claim 30, further comprising an electrical power module slidably secured within the chamber, wherein the electrical power module is slidably secured within the chamber via a third pair of adjustable guides that are longitudinally spaced-apart from the first and second pairs of adjustable guides and that are configured to allow the electrical power module to be slidably secured within the chamber at more than one angle relative to the housing rear wall, wherein the electrical power module comprises one or more electrical outlets, wherein each electrical outlet is adapted to receive a power cord or adapter from electrical equipment disposed within the chamber.

34. The cable distribution system according to claim 33, further comprising a locking mechanism configured to releasably secure the electrical power module within the chamber.

35. The cable distribution system according to claim 30, further comprising a cover removably secured to the housing, wherein the cover is configured to enclose the chamber.

36. The cable distribution system according to claim 30, wherein each side wall has an inner and outer surface, and wherein one or more mounting ears extend outwardly from the outer surface of each side wall, wherein the mounting ears are configured to support the housing from building wall framing.

37. A cable distribution apparatus, comprising:

a housing, comprising a rear wall joined to one or more forwardly projecting walls to define a forwardly open chamber, wherein the chamber includes multiple identical cable distribution module mounting locations therewithin;

a video cable distribution module removably secured within the chamber at anyone of the multiple cable distribution module mounting locations, wherein the video cable distribution module comprises a plurality of jacks adapted to receive a respective plurality of video cables extending into the chamber via one or more of the apertures;

a telecommunications cable distribution module removably secured within the chamber at any one of the multiple cable distribution module mounting locations, wherein the telecommunications cable distribution module comprises a plurality of jacks adapted to receive a respective plurality of telecommunications cables extending into the chamber via one or more of the apertures;

wherein the video cable distribution module and the telecommunications cable distribution module can be interchangeably removably secured within the chamber at any one of the cable distribution module mounting locations; and at least one cable comb secured within the housing, wherein each cable comb comprises a plurality of adjacent, spaced-apart members that define respective cable receptacles, and wherein each cable receptacle is configured to retain at least two video cables or telecommunications cables therein in single row alignment.

38. The cable distribution apparatus according to claim 37, further comprising a locking mechanism configured to releasably secure the telecommunications cable distribution module within the chamber and a locking mechanism configured to releasably secure the video cable distribution module within the chamber.

39. The cable distribution apparatus according to claim 37, further comprising an electrical power module removably secured within the chamber at any one of the multiple cable distribution module mounting locations, wherein the electrical power module comprises one or more electrical outlets, wherein each electrical outlet is adapted to receive a power cord or adapter from electrical equipment disposed within the chamber.

40. The cable distribution apparatus according to claim 39, further comprising a locking mechanism configured to releasably secure the electrical power module within the chamber.

41. The cable distribution apparatus according to claim 37, further comprising a cover removably secured to the housing, wherein the cover is configured to enclose the chamber.

* * * * *